(12) United States Patent
Wheatley et al.

(10) Patent No.: US 9,541,698 B2
(45) Date of Patent: Jan. 10, 2017

(54) BACKLIGHTS HAVING SELECTED OUTPUT LIGHT FLUX DISTRIBUTIONS AND DISPLAY SYSTEMS USING SAME

(75) Inventors: John A. Wheatley, Lake Elmo, MN (US); Michael A. Meis, Stillwater, MN (US); Rolf W. Biernath, Wyoming, MN (US); Philip E. Watson, Singapore (SG); Tao Liu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1563 days.

(21) Appl. No.: 12/918,549

(22) PCT Filed: Feb. 18, 2009

(86) PCT No.: PCT/US2009/034369
§ 371 (c)(1),
(2), (4) Date: Dec. 10, 2010

(87) PCT Pub. No.: WO2009/105450
PCT Pub. Date: Aug. 27, 2009

(65) Prior Publication Data
US 2011/0096529 A1  Apr. 28, 2011

Related U.S. Application Data

(60) Provisional application No. 61/030,767, filed on Feb. 22, 2008.

(51) Int. Cl.
*F21V 7/04* (2006.01)
*F21V 8/00* (2006.01)

(52) U.S. Cl.
CPC ........... *G02B 6/0046* (2013.01); *G02B 6/0096* (2013.01); *G02B 6/0051* (2013.01); *G02B 6/0053* (2013.01)

(58) Field of Classification Search
CPC ... G02B 6/0053; G02B 6/0046; G02B 6/0051; G02B 6/0096
(Continued)

(56) References Cited

U.S. PATENT DOCUMENTS 3,610,729 A  10/1971 Rogers
3,711,176 A  1/1973 Alfrey, Jr.
(Continued)

FOREIGN PATENT DOCUMENTS

DE  199 61 491  12/2000
EP  0 426 397  5/1991
(Continued)

OTHER PUBLICATIONS

Cai et al., "Reflectors for Efficient and Uniform Distribution of Radiation for Lighting and Infrared Based on Non-Imaging Optics", SPIE, vol. 1528, pp. 118-128, 1991.
(Continued)

*Primary Examiner* — Jong-Suk James Lee
*Assistant Examiner* — Bryon T Gyllstrom
(74) *Attorney, Agent, or Firm* — Philip Y. Dahl

(57) ABSTRACT

A backlight that includes a front reflector (120) and a back reflector (130) that form a hollow light recycling cavity including an output surface (104) is disclosed. At least a portion of the back reflector is non-parallel to the front reflector. The backlight also includes at least one semi-specular element disposed within the hollow light recycling cavity, and one or more light sources (140) disposed to emit light into the hollow light recycling cavity, where the one or more light sources are configured to emit light into the hollow light recycling cavity over a limited angular range.

31 Claims, 5 Drawing Sheets

(58) Field of Classification Search
USPC ........................................ 362/600, 607, 609
See application file for complete search history.

(56) References Cited

U.S. PATENT DOCUMENTS

| | | | |
|---|---|---|---|
| 3,773,882 A | 11/1973 | Schrenk | |
| 3,884,606 A | 5/1975 | Schrenk | |
| 4,040,727 A | 8/1977 | Ketchpel | |
| 4,446,305 A | 5/1984 | Rogers | |
| 4,456,336 A | 6/1984 | Chung | |
| 4,540,623 A | 9/1985 | Im | |
| 4,791,540 A | 12/1988 | Dreyer | |
| 5,103,337 A | 4/1992 | Schrenk | |
| 5,126,880 A | 6/1992 | Wheatley | |
| 5,136,479 A | 8/1992 | Ruffner | |
| 5,337,068 A | 8/1994 | Stewart | |
| 5,360,659 A | 11/1994 | Arends | |
| 5,381,309 A | 1/1995 | Borchardt | |
| 5,440,197 A | 8/1995 | Gleckman | |
| 5,448,404 A | 9/1995 | Schrenk | |
| 5,453,855 A | 9/1995 | Nakamura | |
| 5,568,316 A | 10/1996 | Schrenk | |
| 5,594,830 A | 1/1997 | Winston | |
| 5,751,388 A | 5/1998 | Larson | |
| 5,771,328 A | 6/1998 | Wortman | |
| 5,793,456 A | 8/1998 | Broer | |
| 5,816,677 A | 10/1998 | Kurematsu | |
| 5,825,543 A | 10/1998 | Ouderkirk | |
| 5,828,488 A | 10/1998 | Ouderkirk | |
| 5,839,812 A * | 11/1998 | Ge et al. | 362/607 |
| 5,845,038 A | 12/1998 | Lundin | |
| 5,867,316 A | 2/1999 | Carlson | |
| 5,882,774 A | 3/1999 | Jonza | |
| 5,965,247 A | 10/1999 | Jonza | |
| 5,971,551 A | 10/1999 | Winston | |
| 5,976,686 A | 11/1999 | Kaytor | |
| 6,019,485 A | 2/2000 | Winston | |
| 6,036,328 A | 3/2000 | Ohtsuki | |
| 6,080,467 A | 6/2000 | Weber | |
| 6,122,103 A | 9/2000 | Perkins | |
| 6,157,486 A | 12/2000 | Benson, Jr. | |
| 6,157,490 A | 12/2000 | Wheatley | |
| 6,210,785 B1 | 4/2001 | Weber | |
| 6,262,842 B1 | 7/2001 | Ouderkirk | |
| 6,267,492 B1 | 7/2001 | Reid | |
| 6,276,803 B1 | 8/2001 | Aoyama | |
| 6,280,063 B1 | 8/2001 | Fong | |
| 6,282,821 B1 | 9/2001 | Freier | |
| 6,354,709 B1 | 3/2002 | Campbell | |
| 6,367,941 B2 | 4/2002 | Lea | |
| 6,368,699 B1 | 4/2002 | Gilbert | |
| 6,454,452 B1 | 9/2002 | Sasagawa | |
| 6,531,230 B1 | 3/2003 | Weber | |
| 6,566,689 B2 | 5/2003 | Hoelen | |
| 6,600,175 B1 | 7/2003 | Baretz et al. | |
| 6,636,283 B2 | 10/2003 | Sasagawa | |
| 6,663,262 B2 | 12/2003 | Boyd et al. | |
| 6,673,425 B1 | 1/2004 | Hebrink | |
| 6,738,349 B1 | 5/2004 | Cen | |
| 6,762,743 B2 | 7/2004 | Yoshihara | |
| 6,783,349 B2 | 8/2004 | Neavin | |
| 6,788,358 B1 | 9/2004 | Kim | |
| 6,809,892 B2 | 10/2004 | Toyooka | |
| 6,814,456 B1 | 11/2004 | Huang | |
| 6,846,089 B2 | 1/2005 | Stevenson | |
| 6,893,135 B2 | 5/2005 | Wright | |
| 6,895,164 B2 | 5/2005 | Saccomanno | |
| 6,905,212 B2 | 6/2005 | Pate | |
| 6,905,220 B2 | 6/2005 | Wortman | |
| 6,917,399 B2 | 7/2005 | Pokorny | |
| 6,937,303 B2 | 8/2005 | Jang | |
| 6,974,229 B2 | 12/2005 | West | |
| 6,975,455 B1 | 12/2005 | Kotchick | |
| 7,009,343 B2 | 3/2006 | Lim | |
| 7,033,064 B2 * | 4/2006 | Ida | 362/634 |
| 7,052,168 B2 | 5/2006 | Epstein | |
| 7,072,096 B2 | 7/2006 | Holman | |
| 7,128,457 B2 | 10/2006 | Hashimoto | |
| 7,164,836 B2 | 1/2007 | Wright | |
| 7,178,965 B2 | 2/2007 | Parker | |
| 7,220,026 B2 | 5/2007 | Ko | |
| 7,220,036 B2 | 5/2007 | Yi | |
| 7,223,005 B2 | 5/2007 | Lamb | |
| 7,229,198 B2 | 6/2007 | Sakai | |
| 7,277,609 B2 | 10/2007 | Cassarly | |
| 7,285,802 B2 | 10/2007 | Ouderkirk | |
| 7,296,916 B2 | 11/2007 | Ouderkirk | |
| 7,317,182 B2 | 1/2008 | Schultz | |
| 7,320,538 B2 | 1/2008 | Ko | |
| 7,329,982 B2 | 2/2008 | Conner | |
| 7,364,342 B2 | 4/2008 | Parker et al. | |
| 7,416,309 B2 | 8/2008 | Ko | |
| 7,436,469 B2 | 10/2008 | Gehlsen | |
| 7,436,996 B2 | 10/2008 | Ben-Chorin | |
| 7,446,827 B2 | 11/2008 | Ko | |
| 7,481,563 B2 | 1/2009 | David | |
| 7,513,634 B2 | 4/2009 | Chen | |
| 7,525,126 B2 | 4/2009 | Leatherdale | |
| 7,604,381 B2 | 10/2009 | Hebrink et al. | |
| 7,607,814 B2 | 10/2009 | Destain | |
| 7,660,509 B2 | 2/2010 | Bryan | |
| 7,695,180 B2 | 4/2010 | Schardt | |
| 7,740,387 B2 | 6/2010 | Schultz | |
| 7,773,834 B2 | 8/2010 | Ouderkirk | |
| 2001/0030857 A1 | 10/2001 | Futhey et al. | |
| 2002/0060907 A1 | 5/2002 | Saccomanno | |
| 2002/0070914 A1 | 6/2002 | Bruning et al. | |
| 2002/0141194 A1 | 10/2002 | Wortman | |
| 2002/0159019 A1 | 10/2002 | Pokorny | |
| 2002/0175632 A1 | 11/2002 | Takeguchi | |
| 2003/0043567 A1 | 3/2003 | Hoelen | |
| 2003/0086680 A1 | 5/2003 | Saccomanno | |
| 2003/0202363 A1 | 10/2003 | Adachi | |
| 2004/0008504 A1 * | 1/2004 | Wang et al. | 362/31 |
| 2004/0061814 A1 | 4/2004 | Kim | |
| 2004/0066651 A1 | 4/2004 | Harumoto | |
| 2004/0119908 A1 | 6/2004 | Sakai | |
| 2004/0130882 A1 * | 7/2004 | Hara et al. | 362/31 |
| 2004/0141309 A1 * | 7/2004 | Ida | 362/31 |
| 2004/0196667 A1 | 10/2004 | Lea | |
| 2004/0219338 A1 | 11/2004 | Hebrink | |
| 2005/0007756 A1 | 1/2005 | Yu | |
| 2005/0007758 A1 | 1/2005 | Lee | |
| 2005/0063195 A1 | 3/2005 | Kawakami | |
| 2005/0073825 A1 | 4/2005 | Kuo | |
| 2005/0135115 A1 | 6/2005 | Lamb | |
| 2005/0135117 A1 | 6/2005 | Lamb | |
| 2005/0200295 A1 | 9/2005 | Lim | |
| 2005/0243576 A1 | 11/2005 | Park | |
| 2005/0265029 A1 | 12/2005 | Epstein et al. | |
| 2005/0265042 A1 | 12/2005 | Kim | |
| 2005/0265046 A1 | 12/2005 | Liu | |
| 2005/0280756 A1 | 12/2005 | Kim | |
| 2005/0285133 A1 | 12/2005 | Hung | |
| 2005/0286264 A1 | 12/2005 | Kim | |
| 2006/0002141 A1 | 1/2006 | Ouderkirk | |
| 2006/0005620 A1 | 1/2006 | Koike | |
| 2006/0028817 A1 | 2/2006 | Parker | |
| 2006/0082700 A1 | 4/2006 | Gehlsen | |
| 2006/0103777 A1 | 5/2006 | Ko | |
| 2006/0124918 A1 | 6/2006 | Miller | |
| 2006/0131601 A1 | 6/2006 | Ouderkirk | |
| 2006/0146562 A1 | 7/2006 | Ko | |
| 2006/0146566 A1 | 7/2006 | Ko | |
| 2006/0152943 A1 | 7/2006 | Ko | |
| 2006/0187650 A1 | 8/2006 | Epstein | |
| 2006/0193577 A1 | 8/2006 | Ouderkirk | |
| 2006/0210726 A1 | 9/2006 | Jones | |
| 2006/0220040 A1 | 10/2006 | Suzuki | |
| 2006/0221610 A1 | 10/2006 | Chew | |
| 2006/0250707 A1 | 11/2006 | Whitney | |
| 2006/0257678 A1 | 11/2006 | Benson | |
| 2006/0262564 A1 | 11/2006 | Baba | |
| 2006/0268554 A1 | 11/2006 | Whitehead | |

(56) References Cited

U.S. PATENT DOCUMENTS

| | | |
|---|---|---|
| 2006/0284569 A1 | 12/2006 | Wey |
| 2006/0290842 A1 | 12/2006 | Epstein |
| 2006/0290844 A1 | 12/2006 | Epstein |
| 2007/0008722 A1 | 1/2007 | Fujino |
| 2007/0024994 A1 | 2/2007 | Whitney |
| 2007/0047228 A1 | 3/2007 | Thompson |
| 2007/0047254 A1 | 3/2007 | Schardt |
| 2007/0047262 A1 | 3/2007 | Schardt |
| 2007/0081330 A1 | 4/2007 | Lee |
| 2007/0091641 A1 | 4/2007 | Lin |
| 2007/0092728 A1 | 4/2007 | Ouderkirk |
| 2007/0147037 A1 | 6/2007 | Wang |
| 2007/0153162 A1 | 7/2007 | Wright |
| 2007/0153384 A1 | 7/2007 | Ouderkirk |
| 2007/0153548 A1 | 7/2007 | Hamada |
| 2007/0165420 A1* | 7/2007 | Weng et al. ............... 362/609 |
| 2007/0171626 A1* | 7/2007 | Chang ........................ 362/97 |
| 2007/0171676 A1* | 7/2007 | Chang ........................ 362/613 |
| 2007/0189015 A1* | 8/2007 | Chang et al. ............... 362/341 |
| 2007/0189032 A1* | 8/2007 | Chang ........................ 362/600 |
| 2007/0223245 A1 | 9/2007 | Lee |
| 2007/0257266 A1 | 11/2007 | Leatherdale |
| 2007/0257270 A1 | 11/2007 | Lu |
| 2007/0258241 A1 | 11/2007 | Leatherdale |
| 2007/0258246 A1 | 11/2007 | Leatherdale |
| 2007/0274095 A1* | 11/2007 | Destain ..................... 362/609 |
| 2008/0002256 A1 | 1/2008 | Sasagawa |
| 2008/0025045 A1 | 1/2008 | Mii |
| 2008/0049419 A1 | 2/2008 | Ma |
| 2008/0057277 A1 | 3/2008 | Bluem |
| 2010/0156953 A1 | 6/2010 | Nevitt |
| 2010/0165001 A1 | 7/2010 | Savvateev |
| 2010/0165621 A1 | 7/2010 | Hoffend |
| 2010/0165660 A1 | 7/2010 | Weber |
| 2010/0238686 A1 | 9/2010 | Weber |
| 2010/0315832 A1 | 12/2010 | Pijlman |
| 2011/0051047 A1 | 3/2011 | O'Neill |
| 2011/0075398 A1 | 3/2011 | Wheatley |
| 2011/0096529 A1 | 4/2011 | Wheatley |
| 2011/0134659 A1 | 6/2011 | Aastuen |

FOREIGN PATENT DOCUMENTS

| | | |
|---|---|---|
| EP | 0 650 010 | 4/1995 |
| EP | 1 070 913 | 1/2001 |
| EP | 1 376 708 | 1/2004 |
| EP | 1 333 705 | 8/2004 |
| EP | 1 640 756 | 3/2006 |
| EP | 1 837 701 | 9/2007 |
| EP | 1 942 302 | 9/2008 |
| JP | H05-33193 U | 4/1993 |
| JP | 09-005737 | 1/1997 |
| JP | 11-72625 | 3/1999 |
| JP | 2004-031180 | 1/2004 |
| JP | 2004-055430 | 2/2004 |
| JP | 2004-071576 | 3/2004 |
| JP | 2004-087973 | 3/2004 |
| JP | 2004-158336 | 6/2004 |
| JP | 2004-171947 | 6/2004 |
| JP | 2004-288498 | 10/2004 |
| JP | 2004-342429 | 12/2004 |
| JP | 2005-093147 | 4/2005 |
| JP | 2005-173546 | 6/2005 |
| JP | 2005-292546 | 10/2005 |
| JP | 2005-327682 | 11/2005 |
| JP | 2006-221922 | 8/2006 |
| JP | 2006-269364 | 10/2006 |
| JP | 2006-269365 | 10/2006 |
| JP | 2008-060061 | 3/2008 |
| WO | 95/17303 | 6/1995 |
| WO | 95/17691 | 6/1995 |
| WO | 95/17692 | 6/1995 |
| WO | 95/17699 | 6/1995 |
| WO | 96/19347 | 6/1996 |
| WO | 97/01726 | 1/1997 |
| WO | 99/36262 | 7/1999 |
| WO | 99/39224 | 8/1999 |
| WO | 00/43815 | 7/2000 |
| WO | 02/097324 | 12/2002 |
| WO | WO 03/100481 | 12/2003 |
| WO | 2004/031818 | 4/2004 |
| WO | 2006/010249 | 2/2006 |
| WO | 2006/043344 | 4/2006 |
| WO | 2006/125174 | 11/2006 |
| WO | 2008/144636 | 11/2008 |
| WO | 2008/144644 | 11/2008 |
| WO | 2008/144650 | 11/2008 |
| WO | 2008/144656 | 11/2008 |
| WO | 2008/146229 | 12/2008 |
| WO | 2008/147753 | 12/2008 |
| WO | 2009/100307 | 8/2009 |

OTHER PUBLICATIONS

Collares-Pereira et al., "High Concentration Two-Stage Optics for Parabolic Trough Solar Collectors with Tubular Absorber and Large Rim Angle", Solar Energy, vol. 47, No. 6, pp. 457-466, 1991.

Baker et al., *Daylighting in Architecture: A European Reference Book*, pp. 4.3-4.5 1993.

Blanco et al., "Asymmetric CPC Solar Collectors with Tubular Receiver: Geometric Characteristics and Optimal Configurations", Solar Energy, vol. 37, No. 1, pp. 49-54, 1986.

Hung et al., Novel Design for LED Lens and Backlight System, pp. 476-479, IDMC 2007 Taipei, Taiwan.

Tripanagnostopoulos, Y. and Souliotis, M., "Intergrated collector storage solar systems with asymmetric CPC reflectors", Renewable Energy, vol. 29, pp. 223-248, www.sciencedirect.com, 2004.

Winston et al., *Nonimaging Optics*, Title Page & Table of Contents, Elsevier Academic Press, Amsterdam, 2005.

U.S. Appl. No. 61/058780, entitled "Hollow Backlight with Tilted Light Source", filed Jun. 4, 2008.

3M Diffusing Film Alternative (DFA), Maximum uniformity and efficiency in flat panel displays, Brochure, 2 pages, 1996.

Denker et al., 45.1: Invited Paper: Advanced Polarizer Film for Improved Performance of Liquid Crystal Displays, 3 pages, SID 2006.

Freyssinier et al., "Evaluation of light emitting diodes for signage applications", Third International Conference of Solid State Lighting, Proceedings of SPIE, 5187, 309-317, 2004.

Kalantar and Okada, "RGB-LED Backlighting Monitor/TV for Reproduction of Images in Standard and Extended Color Spaces", FMC10-3, pp. 683-686, International Display Workshop, 2004.

Macleod, H.A., Thin-film optical filters, Second Edition, Title Page and Table of Contents, MacMillan Publishing Co., New York, 1986.

Stover, Carl PhD, Advanced Polarizer Film for Improved Performance of Liquid Crystal Displays, 10 pages, Presented at the Society for Information Displays International Conference, San Francisco, CA, Jun. 4-9, 2006.

TCO 05 (The Swedish Confederation of Professional Employees, version 2.0, Sep. 21, 2005, p. 9.

Thelan, Design of Optical Interference Coatings, McGraw Hill, Inc., Title Page, Table of Contents, and Preface, 5 pages, 1989.

Video Electronics Standards Association (VESA), Flat Panel Display Measurements Standard, v. 2.0, Jun. 1, 2001.

Weber et al., "Giant Birefringent Optics in Multilayer Polymer Mirrors", Science, vol. 287, Mar. 2000.

Vikuiti™ Display Enhancement Brochure, Vikuiti™ Brightness Enhancement Film (BEF) II, 2 pages, Copyright © 3M IPC, 2002.

Vikuiti™ Display Enhancement Brochure, Vikuiti™ Brightness Enhancement Film-Diffuse 400 (DBEF-D400), 2 pages, Copyright ©, 2004.

Vikuiti™ Display Enhancement Brochure, Vikuiti™ Dual Brightness Enhancement Film—Diffuse 550 (DBEF-D550), 2 pages, © 3M 2004.

U.S. Appl. No. 61/026,876, entitled "Hollow Backlight with Structured Films", filed Feb. 7, 2008.

U.S. Appl. No. 60/939,085, entitled "Recycling Backlights with Semi-specular Components", filed May 20, 2007.

(56) References Cited

OTHER PUBLICATIONS

U.S. Appl. No. 60/939,084, entitled "Thin Hollow Backlights with Beneficial Design Characteristics", filed May 20, 2007.
U.S. Appl. No. 60/939,083, entitled "White Light Backlights and the Like with Efficient Utilization of Colored LED Sources", filed May 20, 2007.
U.S. Appl. No. 60/939,082, entitled "Collimating Light Injectors for Edge-lit Backlights", filed May 20, 2007.
U.S. Appl. No. 60/939,079, entitled "Backlight and Display System Using Same", filed May 20, 2007.
U.S. Appl. No. 60/744,112, entitled "Wide Angle Mirror System", filed Mar. 31, 2006.
U.S. Appl. No. 60/978304, entitled "Light Emitting Diode with Bonded Semiconductor Wavelength Converter", filed Oct. 8, 2007.
Search Report for International Application No. PCT/US2008/034369, 5 pgs.
Written Opinion for International Application No. PCT/US2008/034369, 8 pgs.
U.S. Appl. No. 61/013,782, entitled "Optical Article", filed Dec. 14, 2007.

\* cited by examiner

BACKLIGHTS HAVING SELECTED OUTPUT LIGHT FLUX DISTRIBUTIONS AND DISPLAY SYSTEMS USING SAME

RELATED APPLICATIONS

This application is a national stage filing under 35 U.S.C. 371 of PCT/US2009/034369, filed on Feb. 18, 2009, which claims the benefit of U.S. Provisional Patent Application No. 61/030,767, filed Feb. 22, 2008, the disclosure of which is incorporated by reference in its entirety.

BACKGROUND

Backlights can be considered to fall into one of two categories depending on where the light sources are positioned relative to the output area of the backlight, where the backlight "output area" corresponds to the viewable area or region of the display device. The "output area" of a backlight is sometimes referred to herein as an "output region" or "output surface" to distinguish between the region or surface itself and the area (the numerical quantity having units of square meters, square millimeters, square inches, or the like) of that region or surface.

The first category is "edge-lit." In an edge-lit backlight, one or more light sources are disposed—from a plan-view perspective—along an outer border or periphery of the backlight construction, generally outside the area or zone corresponding to the output area. Often, the light source(s) are shielded from view by a frame or bezel that borders the output area of the backlight. The light source(s) typically emit light into a component referred to as a "light guide," particularly in cases where a very thin profile backlight is desired, as in laptop computer displays. The light guide is a clear, solid, and relatively thin plate whose length and width dimensions are on the order of the backlight output area. The light guide uses total internal reflection (TIR) to transport or guide light from the edge-mounted lamps across the entire length or width of the light guide to the opposite edge of the backlight, and a non-uniform pattern of localized extraction structures is provided on a surface of the light guide to redirect some of this guided light out of the light guide toward the output area of the backlight. Such backlights typically also include light management films, such as a reflective material disposed behind or below the light guide, and a reflective polarizing film and prismatic BEF film(s) disposed in front of or above the light guide, to increase on-axis brightness.

In the view of Applicants, drawbacks or limitations of existing edge-lit backlights include the following: the relatively large mass or weight associated with the light guide, particularly for larger backlight sizes; the need to use components that are non-interchangeable from one backlight to another, since light guides must be injection molded or otherwise fabricated for a specific backlight size and for a specific source configuration; the need to use components that require substantial spatial non-uniformities from one position in the backlight to another, as with existing extraction structure patterns; and, as backlight sizes increase, increased difficulty in providing adequate illumination due to limited space or "real estate" along the edge of the display, since the ratio of the circumference to the area of a rectangle decreases linearly (1/L) with the characteristic in-plane dimension L (e.g., length, or width, or diagonal measure of the output region of the backlight, for a given aspect ratio rectangle).

The second category of backlight is "direct-lit." In a direct-lit backlight, one or more light sources are disposed—from a plan-view perspective—substantially within the area or zone corresponding to the output area, normally in a regular array or pattern within the zone. Alternatively, one can say that the light source(s) in a direct-lit backlight are disposed directly behind the output area of the backlight. A strongly diffusing plate is typically mounted above the light sources to spread light over the output area. Again, light management films, such as a reflective polarizer film, and prismatic BEF film(s), can also be placed above the diffuser plate for improved on-axis brightness and efficiency.

In the view of Applicants, drawbacks or limitations of existing direct-lit backlights include the following: inefficiencies associated with the strongly diffusing plate; in the case of LED sources, the need for large numbers of such sources for adequate uniformity and brightness, with associated high component cost and heat generation; and limitations on achievable thinness of the backlight beyond which light sources produce non-uniform and undesirable "punch-through," wherein a bright spot appears in the output area above each source.

In some cases, a direct-lit backlight may also include one or some light sources at the periphery of the backlight, or an edge-lit backlight may include one or some light sources directly behind the output area. In such cases, the backlight is considered "direct-lit" if most of the light originates from directly behind the output area of the backlight, and "edge-lit" if most of the light originates from the periphery of the output area of the backlight.

Backlights of one type or another are usually used with liquid crystal (LC)-based displays. Liquid crystal display (LCD) panels, because of their method of operation, utilize only one polarization state of light, and hence for LCD applications it may be important to know the backlight's brightness and uniformity for light of the correct or useable polarization state, rather than simply the brightness and uniformity of light that may be unpolarized. In that regard, with all other factors being equal, a backlight that emits light predominantly or exclusively in the useable polarization state is more efficient in an LCD application than a backlight that emits unpolarized light. Nevertheless, backlights that emit light that is not exclusively in the useable polarization state, even to the extent of emitting randomly polarized light, are still fully useable in LCD applications, since the non-useable polarization state can be eliminated by an absorbing polarizer provided between the LCD panel and the backlight.

SUMMARY

In one aspect, the present disclosure provides a backlight that includes a partially transmissive front reflector and a back reflector that form a hollow light recycling cavity having an output surface. At least a first portion of the back reflector is non-parallel to the front reflector. The backlight also includes at least one semi-specular element disposed within the hollow light recycling cavity, and one or more light sources disposed to emit light into the hollow light recycling cavity. The one or more light sources are configured to emit light into the hollow light recycling cavity over a limited angular range.

In another aspect, the present disclosure provides a method of forming a backlight that is operable to provide a desired output light flux distribution. The method includes forming a hollow light recycling cavity having an output surface, where the hollow light recycling cavity further includes a partially transmissive front reflector and a planar back reflector. The method further includes positioning one or more light sources to emit light into the light recycling cavity over a limited angular range; selecting the desired output light flux distribution; measuring a first output light flux distribution; comparing the first output light flux distribution to the desired output light flux distribution; shaping the back reflector; measuring a second output light flux distribution; and comparing the second output light flux distribution to the desired output light flux distribution.

In another aspect, the present disclosure provides a display system that includes a display panel, and a backlight disposed to provide light to the display panel. The backlight includes a partially transmissive front reflector and a back reflector that form a hollow light recycling cavity having an output surface. At least a first portion of the back reflector is non-parallel to the front reflector. The backlight also includes at least one semi-specular element disposed within the hollow light recycling cavity, and one or more light sources disposed to emit light into the hollow light recycling cavity, where the one or more light sources are configured to emit light into the hollow light recycling cavity over a limited angular range.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein.

DETAILED DESCRIPTION

Figure 1:
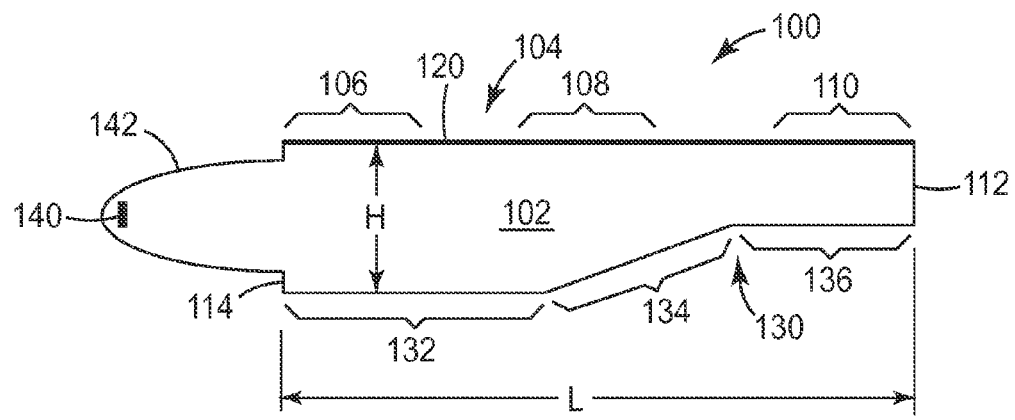
FIG. 1 is a schematic cross-section view of one embodiment of an edge-lit hollow backlight.

In general, the present disclosure describes several embodiments of thin, hollow backlights that can be configured to provide selected output light flux distributions. For example, in some embodiments, the backlights of the present disclosure can be configured to provide a uniform light flux distribution at output surfaces of the backlights. The term "uniform" refers to light flux distributions that have no observable brightness features or discontinuities that would be objectionable to a viewer. The acceptable uniformity of an output light flux distribution will often depend on the application, e.g., a uniform output light flux distribution in a general lighting application may not be considered uniform in a display application.

Further, for example, at least one or more of the embodiments of backlights of the present disclosure can be configured to provide an output light flux distribution that has an increased flux near a center region of the output surface compared to the flux near an edge region of the backlight. In some embodiments, a ratio of the luminance proximate a center region of the output surface to the luminance proximate an edge region of the output surface is at least about 1.10. While such an output light flux distribution may be considered non-uniform, for some applications, this type of distribution may be desired. Any suitable output light flux distribution can be provided.

In at least one of these embodiments, the backlight includes a partially transmissive front reflector and a back reflector that form a hollow light recycling cavity having an output surface. At least a portion of the back reflector is non-parallel to the front reflector. This exemplary backlight can also include at least one semi-specular element disposed within the cavity, and one or more light sources disposed to emit light into the cavity over a limited angular range.

As used herein, the term "output light flux distribution" refers to the variation in brightness over the output surface of the backlight. The term "brightness" refers to the light output per unit area into a unit solid angle ($cd/m^2$).

While not wishing to be bound by any particular theory, the output light flux distribution of the backlights described herein can be tailored by controlling one or more of the following parameters:
1. The positioning of the front reflector relative to the back reflector;
2. The shape of one or both of the front and back reflectors;
3. The reflective and transmissive properties of the front and back reflectors;
4. The reflective properties of the at least one semi-specular element; and
5. The average flux deviation angle of light emitted into the cavity by the one or more light sources.

Controlling these factors involves balancing between filling the light recycling cavity with light and turning or redirecting light within the cavity such that at least a portion transmits through the front reflector at desired locations of the output surface.

In general, light propagating within the cavity can be thought of as falling into two angular distributions or zones: the transport zone and the transmission zone. The transport zone includes light propagating in directions within the cavity such that the light is not likely to be transmitted through the front reflector. The angular range of light in the transport zone will at least in part depend on the reflection and transmission properties of the front and back reflectors, the reflection properties of the semi-specular element within the cavity, and the geometry of the cavity. For example, in some embodiments of backlights described herein, various front reflectors are included that exhibit an increasing reflectivity for light that is incident, e.g., within an angle with the front reflector's major surface of 30 degrees or less. For these front reflectors, the transport zone can be defined as including light that is propagating within the cavity in a direction that is within 30 degrees of the surface of the front reflector. In other embodiments, the front reflector may not exhibit this increased reflectivity for off-angle light. In these embodiments, the transport zone may be defined as including light propagating within the cavity in a direction that is substantially parallel to a major surface of the front reflector.

The transmission zone includes light propagating within the cavity in directions that allow at least a portion of such light to transmit through the front reflector. In other words, the transmission zone includes propagating light that is not in the transport zone.

For a backlight having a front reflector and back reflector that are substantially parallel, a light flux distribution at an output surface of the backlight can at least in part be determined by the rate of conversion of light from the transport zone to the transmission zone. This rate depends on several factors, e.g., the reflectance and specularity of the front, back, and edge reflectors of the backlight, the number of illuminated edges of the backlight, the light injection angle of the one or more light sources, and the ratio of the length L of the backlight to the thickness H. By adjusting H, the rate of conversion of light from the transport zone to the transmission zone can at least in part be controlled.

The thickness H can be adjusted by positioning the front and back reflectors such that at least a portion of the back reflector is non-parallel to the front reflector. For example, as is further described herein, the back reflector can be positioned to form a wedge-shaped hollow light recycling cavity with the front reflector. This wedge shape provides an H that varies in at least one direction in the hollow light recycling cavity.

The thickness H of the light recycling cavity can also be adjusted by shaping one or both of the front and back reflectors to be non-planar. As used herein, the term "non-planar" refers to a reflector, either front or back, that cannot be substantially contained within a plane. A reflector having sub-millimeter structures formed on a substantially planar substrate would not be considered non-planar for purposes of this application. In some embodiments, a backlight can include a non-planar back reflector that includes one or more portions that slope towards the front reflector. These sloping portions can be positioned to provide an increased conversion rate of light from the transport zone to the transmission zone at desired locations within the cavity.

The light flux distribution produced by one or more of the backlights described herein can also be controlled in part by selecting the reflective and/or transmissive properties of one or both of the front and back reflectors. For example, in the case of a backlight designed to emit only light in a particular (useable) polarization state, the front reflector can have a high reflectivity for such useable light to support lateral transport or spreading, and for light ray angle randomization to achieve acceptable spatial uniformity of the backlight output, but a high enough transmission into the appropriate application-useable angles to ensure that application brightness of the backlight is acceptable. Further, in some embodiments, the front reflector of the recycling cavity has a reflectivity that generally increases with angle of incidence, and a transmission that generally decreases with angle of incidence, where the reflectivity and transmission are for unpolarized visible light and for any plane of incidence, and/or for light of a useable polarization state incident in a plane for which oblique light of the useable polarization state is p-polarized (and further, the front reflector has a high value of hemispheric reflectivity while also having a sufficiently high transmission of application-useable light).

An exemplary embodiment of backlight also includes at least one semi-specular element, the reflective properties of which can also be selected to in part determine the output light flux distribution. For example, the semi-specular element or elements can provide the hollow light recycling cavity with a balance of specular and diffuse characteristics, the elements having sufficient specularity to support significant lateral light transport or mixing within the cavity, but also having sufficient diffusivity to substantially homogenize the angular distribution of steady state light within the cavity, even when injecting light into the cavity only over a narrow range of angles (and further, in the case of a backlight designed to emit only light in a particular (useable) polarization state, recycling within the cavity preferably includes a degree of randomization of reflected light polarization relative to the incident light polarization state, which allows a mechanism by which non-useable polarized light is converted into useable polarized light).

Finally, the average flux deviation angle of light emitted into the cavity by the one or more light sources can be controlled to help provide the desired collimation of light injected into the cavity. For example, the backlights described herein can include light injection optics that partially collimate or confine light initially injected into the recycling cavity to propagation directions close to a transverse plane (the transverse plane being parallel to the output area or surface of the backlight), e.g., an injection beam having an average flux deviation angle from the transverse plane in a range from 0 to 40 degrees, or 0 to 30 degrees, or 0 to 15 degrees. In addition to the flux deviation angle, the shape of the light emitted into the cavity by the light sources can be also be controlled. For example, the emitted light can be radially symmetrical about an emission axis.

Backlights for LCD panels, in their simplest form, consist of light generation surfaces such as the active emitting surfaces of LED dies or the outer layers of phosphor in a CCFL bulb, and a geometric and optical arrangement of distributing or spreading this light in such a way as to produce an extended- or large-area illumination surface or region, referred to as the backlight output surface. Generally, this process of transforming very high brightness local sources of light into a large-area output surface results in a loss of light because of interactions with all of the backlight cavity surfaces, and interactions with the light-generation surfaces. To a first approximation, any light that is not delivered by this process through the output area or surface associated with a front reflector—optionally into a desired application viewer-cone (if any), and with a particular (e.g., LCD-useable) polarization state (if any)—is "lost" light. In a commonly assigned related application, we describe a methodology of uniquely characterizing any backlight containing a recycling cavity by two essential parameters. See U.S. Patent Application No. 60/939,084, entitled THIN HOLLOW BACKLIGHTS WITH BENEFICIAL DESIGN CHARACTERISTICS.

A backlight cavity, or more generally any lighting cavity, that converts line or point sources of light into uniform extended area sources of light can be made using a combination of reflective and transmissive optical components. In many cases, the desired cavity is very thin compared to its lateral dimension.

Historically, solid light guides have generally been used for the thinnest backlights and, except for very small displays such as those used in handheld devices, have been illuminated with linearly continuous light sources such as cold cathode fluorescent lights (CCFLs). A solid light guide provides low loss transport of light and specular reflections at the top and bottom surfaces of the light guide via the phenomenon of total internal reflection (TIR) of light. The specular reflection of light provides the most efficient lateral transport of light within a light guide. Extractors placed on the top or bottom surface of a solid light guide redirect the light to direct it out of the light guide, creating in essence a partial reflector.

Solid light guides, however, present several problems for large displays such as cost, weight, and light uniformity. The problem with uniformity for large area displays has increased with the advent of separate red/green/blue (RGB) colored LEDs, which are effectively point sources of light compared to the much larger area of the output region of the backlight. The high intensity point sources can cause uniformity problems with conventional direct-lit backlights as well as edge-lit systems that utilize solid light guides. The uniformity problems can be greatly reduced if a hollow light guide could be made that also provides for significant lateral transport of light as in a solid light guide. In some cases for polarization and light ray angle recycling systems, a hollow cavity can be more proficient at spreading light laterally across a display face than a solid cavity. Some of the components that can be used to accomplish this effectively for a hollow light guide have not generally been available to the backlight industry, or in cases where the components already existed, the hollow light guides have not until now been constructed in the correct fashion to make a uniform, thin, efficient hollow light mixing cavity.

An efficient hollow reflective cavity has several advantages over a solid light guide for making a thin uniform backlight, even though a solid light guide does provide efficient top and bottom reflectors via the phenomenon of Total Internal Reflection (TIR). The solid light guide is used primarily to provide a lateral dispersion of the light before the light interacts with other components such as reflective polarizers and other brightness enhancement films.

However, the TIR surfaces of a solid guide are inadequate to meet all the needs of modern backlights, and additional light control films are typically added both above and below the solid light guide. Most systems that use a solid light guide today also use a separate back reflector to utilize brightness enhancement films such as BEF and DBEF (both available from 3M Company, St. Paul, Minn.). These films recycle light that is extracted from the light guide but is unusable for the display because of unsuitable polarization or angle of propagation. The back reflector is typically a white reflector, which is substantially Lambertian in its reflection characteristics. However, much of the lateral transport is first achieved with the TIR surfaces of the solid guide, and the recycled light is converted and returned to the display with the Lambertian back reflector. If separate top and bottom light management films are required anyway, it can be more efficient to use them alone to create a hollow light guide and also to simultaneously provide the functions of a reflective polarizer and other brightness enhancement films. In this manner, the solid guide, as well as other brightness enhancement films, can be omitted.

We propose replacing the solid light guide with air, and the TIR surfaces of a solid light guide with high efficiency low-loss reflectors. These types of reflectors can be important for facilitating optimal lateral transport of the light within the backlight cavity. Lateral transport of light can be initiated by the optical configuration of the light source, or it can be induced by an extensive recycling of light rays in a cavity that utilizes low loss reflectors.

We can replace the TIR surfaces of the solid light guide with spatially separated low loss reflectors that fall into two general categories. One is a partially transmissive or partial reflector for the front face and the second is a full reflector for the back and side faces. As described above, the latter are often added to solid light guide systems anyway. For optimal transport of light and mixing of light in the cavity, both the front and back reflectors may be specular or semi-specular instead of Lambertian. A semi-specular component of some type is useful somewhere within the cavity to promote uniform mixing of the light. The use of air as the main medium for lateral transport of light in large light guides enables the design of lighter, lower cost, and more uniform display backlights.

For a hollow light guide to significantly promote the lateral spreading of light, the means of light injection into the cavity is important, just as it is in solid light guides. The format of a hollow light guide allows for more options for injecting light at various points in a direct lit backlight, especially in backlights with multiple but optically isolated zones. In a hollow light guide system, the function of the TIR and Lambertian reflectors can be accomplished with the combination of a specular reflector and a semi-specular, forward scattering diffusion element.

Exemplary partial reflectors (front reflectors) we describe here—for example, the asymmetric reflective films (ARFs) described in co-owned U.S. Application No. 60/939,079—provide for low loss reflections and also for better control of transmission and reflection of polarized light than is possible with TIR in a solid light guide alone. Thus, in addition to improved light distribution in a lateral sense across the face of the display, the hollow light guide can also provide for improved polarization control for large systems. Significant control of transmission with angle of incidence is also possible with the ARFs mentioned above. In this manner, light from the mixing cavity can be collimated to a significant degree as well as providing for a polarized light output with a single film construction.

In some embodiments, preferred front reflectors have a relatively high overall reflectivity, to support relatively high recycling within the cavity. We characterize this in terms of "hemispheric reflectivity," meaning the total reflectivity of a component (whether a surface, film, or collection of films) when light is incident on it from all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light yields the hemispheric reflectivity, $R_{hemi}$. Characterizing a reflector in terms of its $R_{hemi}$ is especially convenient for recycling cavities because light is generally incident on the internal surfaces of the cavity—whether the front reflector, back reflector, or side reflectors—at all angles. Further, unlike the reflectivity for normal incidence, $R_{hemi}$ is insensitive to, and already takes into account, the variability of reflectivity with incidence angle, which may be very significant for some components (e.g., prismatic films).

Further, in some embodiments, preferred front reflectors exhibit a (direction-specific) reflectivity that increases with incidence angle away from the normal (and a transmission that generally decreases with angle of incidence), at least for light incident in one plane. Such reflective properties cause the light to be preferentially transmitted out of the front reflector at angles closer to the normal, i.e., closer to the viewing axis of the backlight. This helps to increase the perceived brightness of the display at viewing angles that are important in the display industry (at the expense of lower perceived brightness at higher viewing angles, which are usually less important). We say that the increasing reflectivity with angle behavior is "at least for light incident in one plane," because sometimes a narrow viewing angle is desired for only one viewing plane, and a wider viewing angle is desired in the orthogonal plane. An example is some LCD TV applications, where a wide viewing angle is desired for viewing in the horizontal plane, but a narrower viewing angle is specified for the vertical plane. In other cases narrow angle viewing is desirable in both orthogonal planes so as to maximize on-axis brightness.

With this in mind, let us consider the meaning of specifying (if we desire) that the front reflector "exhibit a reflectivity that generally increases with angle of incidence," in the case where the front reflector is an ARF such as is described in U.S. Patent Application No. 60/939,079. The ARF includes a multilayer construction (e.g., coextruded polymer microlayers that have been oriented under suitable conditions to produce desired refractive index relationships, and desired reflectivity characteristics) having a very high reflectivity for normally incident light in the block polarization state and a lower but still substantial reflectivity (e.g., 25 to 90%) for normally incident light in the pass polarization state. The very high reflectivity of block-state light generally remains very high for all incidence angles. The more interesting behavior is for the pass-state light, since that exhibits an intermediate reflectivity at normal incidence. Oblique pass-state light in the plane of incidence will exhibit an increasing reflectivity with increasing incidence angle, due to the nature of s-polarized light reflectivity (the relative amount of increase, however, will depend on the initial value of pass-state reflectivity at normal incidence). Thus, light emitted from the ARF in a viewing plane will be partially collimated or confined in angle. Oblique pass-state light in the other plane of incidence, however, can exhibit any of three behaviors depending on the magnitude and polarity of the z-axis refractive index difference between microlayers relative to the in-plane refractive index differences, as discussed in the 60/939,079 application.

In one case, a Brewster angle exists, and the reflectivity of this light decreases with increasing incidence angle. This produces bright off-axis lobes in a viewing plane parallel to the output surface, which are usually undesirable in LCD viewing applications (although in other applications this behavior may be acceptable, and even in the case of LCD viewing applications this lobed output may be re-directed towards the viewing axis with the use of a prismatic turning film).

In another case, a Brewster angle does not exist or is very large, and the reflectivity of the p-polarized light is relatively constant with increasing incidence angle. This produces a relatively wide viewing angle in the referenced viewing plane.

In the third case, no Brewster angle exists, and the reflectivity of the p-polarized light increases significantly with incidence angle. This can produce a relatively narrow viewing angle in the referenced viewing plane, where the degree of collimation is tailored at least in part by controlling the magnitude of the z-axis refractive index difference between microlayers in the ARF.

Of course, the reflective surface need not have asymmetric on-axis polarizing properties as with ARF. Symmetric multilayer reflectors, for example, can be designed to have a high reflectivity but with substantial transmission by appropriate choice of the number of microlayers, layer thickness profile, refractive indices, and so forth. In such a case the s-polarized components will increase with incidence angle, in the same manner with each other. Again, this is due to the nature of s-polarized light reflectivity, but the relative amount of increase will depend on the initial value of the normal incidence reflectivity. The p-polarized components will have the same angular behavior as each other, but this behavior can be controlled to be any of the three cases mentioned above by controlling the magnitude and polarity of the z-axis refractive index difference between microlayers relative to the in-plane refractive index differences.

Thus, we see that the increase in reflectivity with incidence angle (if present) in the front reflector can refer to light of a useable polarization state incident in a plane for which oblique light of the useable polarization state is p-polarized. Alternately, such increase in reflectivity can refer to the average reflectivity of unpolarized light, in any plane of incidence.

In some embodiments, the back reflectors also have a high hemispherical reflectivity for visible light, typically, much higher than the front reflector since the front reflector is deliberately designed to be partially transmissive in order to provide the required light output of the backlight. The hemispherical reflectivity of the back reflector is referred to as $R^b_{hemi}$, while that of the front reflector is referred to as $R^f_{hemi}$. Preferably, the product $R^f_{hemi}*R^b_{hemi}$ is at least 55%.

As previously mentioned herein, the output light flux distribution of a backlight can be tailored by adjusting the thickness H of the hollow light recycling cavity. For example, FIG. 1 is a schematic cross-section view of one embodiment of a backlight 100. The backlight 100 includes a partially transmissive front reflector 120 and a back reflector 130 that form a hollow light recycling cavity 102. The cavity 102 includes an output surface 104. As is further described herein, at least a first portion 134 of the back reflector 130 is non-parallel to the front reflector 120. The backlight 100 also includes at least one semi-specular element disposed within the hollow light recycling cavity (not shown) as is further described herein.

As shown in FIG. 1, the backlight 100 also includes one or more light sources 140 disposed to emit light into the light recycling cavity 102. The one or more light sources 140 are configured to emit light into the light recycling cavity 102 over a limited angular range. In the embodiment illustrated in FIG. 1, the light sources 140 are disposed proximate edge 114 of the cavity 102.

The backlight 100 can be any suitable size and shape. In some embodiments, the backlight 100 can have a length L and a width W of one or more millimeters to several meters. Further, in some embodiments, two or more backlights can be tiled together and controlled individually to provide large zoned backlights.

As illustrated, backlight 100 includes an injector or reflector 142 that helps to direct light from the one or more light sources 140 into the light recycling cavity 102. Any suitable injector or reflector can be used with the backlight 100, e.g., wedges, parabolic reflectors, etc. See, e.g., the injectors described in U.S. Patent Application No. 60/939,082, entitled COLLIMATING LIGHT INJECTORS FOR EDGE-LIT BACKLIGHTS.

Although depicted as having one or more light sources 140 positioned along one side or edge of the backlight 100, light sources can be positioned along two, three, four, or more sides of the backlight 100. For example, for a rectangularly shaped backlight, one or more light sources can be positioned along each of the four sides of the backlight.

The front reflector 120 can include any partially transmissive reflector or reflectors, e.g., the partially transmissive reflectors described in co-owned U.S. Patent Application No. 60/939,079, entitled BACKLIGHT AND DISPLAY SYSTEM USING SAME; and U.S. Patent No. 60/939,084, entitled THIN HOLLOW BACKLIGHTS WITH BENEFI- CIAL DESIGN CHARACTERISTICS. In some embodiments, the front reflector 120 can include one or more polymeric multilayer reflective polarizing films as described, e.g., in U.S. Pat. No. 5,882,774 (Jonza et al.) entitled OPTICAL FILM; U.S. Pat. No. 6,905,220 (Wortman et al.) entitled BACKLIGHT SYSTEM WITH MULTILAYER OPTICAL FILM REFLECTOR; U.S. Pat. No. 6,210,785 (Weber et al.) entitled HIGHT EFFICIENCY OPTICAL DEVICES; U.S. Pat. No. 6,783,349 (Neavin et al.) entitled APPARATUS FOR MAKING MULTILAYER OPTICAL FILMS; U.S. Patent Publication No. 2008/0002256 (Sasagawa et al.), entitled OPTICAL ARTICLE INCLUDING A BEADED LAYER; U.S. Pat. No. 6,673,425 (Hebrink et al.) entitled METHOD AND MATERIALS FOR PREVENTING WARPING IN OPTICAL FILMS; U.S. Patent Publication No. 2004/0219338 (Hebrink et al.) entitled MATERIALS, CONFIGURATIONS, AND METHODS FOR REDUCING WARPAGE IN OPTICAL FILMS; and U.S. patent application Ser. No. 11/735,684 (Hebrink et al.) entitled OPTICAL ARTICLE AND METHOD OF MAKING.

In some embodiments, the partially transmissive front reflector 120 can provide polarized light at the output surface. Suitable polarizing front reflectors include, e.g., DBEF, APF, DRPF (all available from 3M Company, St. Paul, Minn.), ARF, TOP, (both as described in the 60/939,079 application), etc. In other embodiments, the partially transmissive front reflector can provide non-polarized light. Suitable non-polarizing front reflectors include, e.g., perforated mirrors, microstructured films, etc. Further examples of non-polarizing films are described, e.g., in U.S. Patent Application No. 60/939,084.

The front reflector 120 is partially transmissive and partially reflective for at least visible light. The partial transmissivity of the front reflector 120 allows at least a portion of light within the cavity 102 to be emitted through the output surface 104 of the cavity 102. The front reflector 120 can include any suitable film(s) and/or layer(s) that provide partial transmission and reflection to light incident upon the front reflector 120 from inside the cavity 102.

In some embodiments, the front reflector 120 is operable to transmit polarized light. In such embodiments, the front reflector 120 includes an on-axis average reflectivity of at least about 90% for visible light polarized in a first plane, and an on-axis average reflectivity of at least about 5% but less than about 90% for visible light polarized in a second plane parallel to the first plane. As used herein, the term "on-axis average reflectivity" refers to the average reflectivity of light incident on a reflector in a direction that is substantially normal to such surface. Further, the term "total hemispherical reflectivity" refers to the total reflectivity of a reflector for light incident on the reflector from all directions within a hemisphere centered around a normal to the reflector. Those skilled in the art would consider light polarized in the second plane to be in a useable polarization state, i.e., such polarized light would pass through the lower absorbing polarizer of an LC panel (e.g., lower absorbing polarizer 858 of FIG. 8) and be incident on the LC panel. Further, those skilled in the art would consider the first plane to be parallel with the block axis and the second plane to be parallel to the pass axis of the polarizing front reflector 120.

Further, in some embodiments, it may be desirable that the average on-axis transmission of the useable polarization state is several times greater than the transmission of non-useable polarization state to ensure that the output from the cavity 102 is substantially the desired polarization state. This also helps to reduce the total loss of useable light from the cavity. In some embodiments, the on-axis transmissivity of useable light to non-useable light is at least 10. In other embodiments, the ratio of transmission of useable light to non-useable light is at least 20.

Figure 4A:
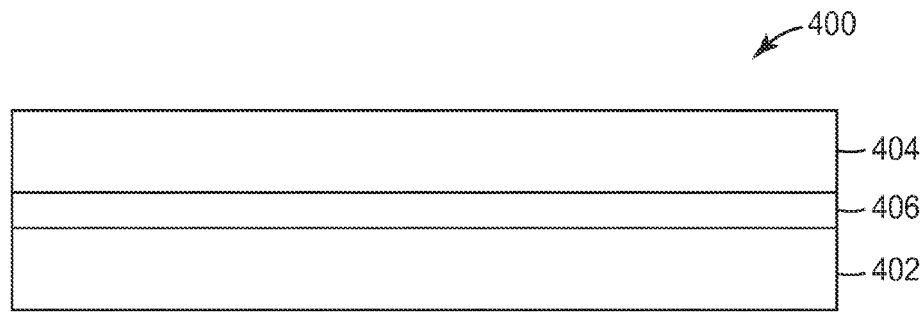
FIGS. 4A-C are schematic cross-section views of various embodiments of front reflectors.

In some embodiments, the front reflector 120 can include two or more films. For example, FIG. 4A is a schematic cross-section view of a portion of a front reflector 400. Reflector 400 includes a first film 402 positioned proximate a second film 404. The films 402, 404 can be spaced apart or in contact with each other. Alternatively, the films 402, 404 can be attached using any suitable technique. For example, the films 402, 404 can be laminated together using optional adhesive layer 406. Any suitable adhesive can be used for layer 406, e.g., pressure sensitive adhesives (such as 3M Optically Clear Adhesives), and UV-curable adhesives (such as UVX-4856). In some embodiments, an adhesive layer 406 can be replaced with an index matching fluid, and the films 402, 404 can be held in contact using any suitable technique known in the art.

Films 402, 404 can include any suitable films described herein in regard to the front reflector. Films 402, 404 can have similar optical characteristics; alternatively, films 402, 404 can be different constructions that provide different optical characteristics. In one exemplary embodiment, film 402 can include an asymmetric reflective film as described herein having a pass axis in one plane, and film 404 can include a second asymmetric reflective film having a pass axis in a second plane that is non-parallel to the pass axis of the first film 402. This non-parallel relationship can form any suitable angle between the two pass axis planes. In some embodiments, the pass axis planes can be nearly orthogonal. Such a relationship would provide a high degree of reflectivity in the pass axis for the front reflector 400.

Further, for example, film 402 may include an asymmetric reflective film, and film 404 may include a prismatic brightness enhancing film such as BEF. In some embodiments, the BEF may be oriented in relation to the asymmetric reflective film such that the BEF collimates transmitted light in a plane that is orthogonal to the collimating plane of the asymmetric film. Alternatively, in other embodiments, the BEF may be oriented such that the BEF collimates transmitted light in the collimating plane of the asymmetric reflective film.

Although the front reflector 400 is depicted in FIG. 4A as including two films 402, 404, the front reflector 400 can include three or more films. For example, a three layer front reflector can be made using three layers of reflective polarizer (such as DBEF or APF, both available from 3M Company, St. Paul, Minn.). If the three layers are arranged such that the polarization axis of the second layer is at 45° relative to the polarization axis of the first layer and the polarization axis of the third layer is at 90° relative to the polarization axis of the first layer, the resulting front reflector will reflect approximately 75% of the normal incidence light. Other angles of rotation between the layers could be used to achieve different levels of reflection. A birefringent (polarization rotating) layer or a scattering layer between two reflective polarizers with nearly orthogonal pass axes can also create reflective films that have a controlled degree of reflectivity to be used as the front reflector.

Figure 4B:
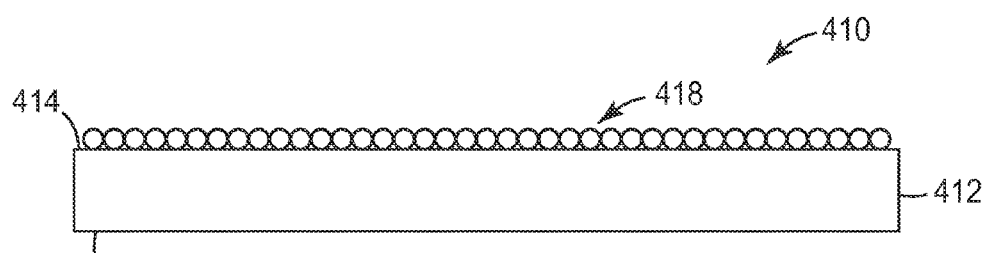

The front reflectors of the present disclosure can also include optical elements positioned in or on one or more surfaces of the reflector. For example, FIG. 4B is a schematic cross-section view of a portion of another embodiment of front reflector 410. The reflector 410 includes a film 412 having a first major surface 414 and a second major surface 416. The film 412 can include any suitable film(s) or layer(s) described herein in regard to a front reflector. A plurality of optical elements 418 are positioned on or in the first major surface 414. Although depicted as positioned only on first major surface 414, optical elements can be positioned on the second major surface 416 or on both first and second major surfaces 414, 416. Any suitable optical elements can be positioned on or in the film 412, e.g., microspheres, prisms, cube-corners, lenses, lenticular elements, etc. The optical elements can be refractive elements, diffractive elements, diffusive elements, etc. In this embodiment, the optical elements 418 can collimate light that is transmitted by film 412. In other embodiments, the optical elements 418 can diffuse light either incident on the film 412 or exiting the film 412, depending upon the positioning of the optical elements 412.

The optical elements 418 can be positioned on a major surface of the film 412 or at least partially embedded in the major surface of the film 412. Further, the film 410 can be manufactured using any suitable technique, e.g., those techniques described in the 60/939,079 application for manufacturing bead-coated ESR.

Figure 4C:
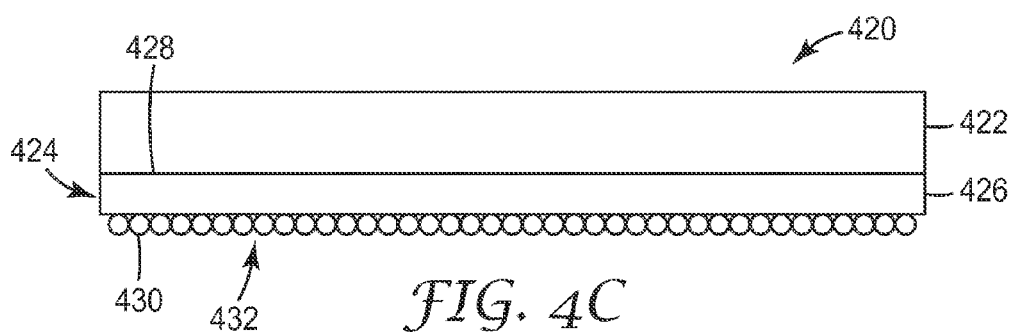

The optical elements 418 can also be positioned on a substrate that is positioned proximate the film 410. For example, FIG. 4C is a schematic cross-section view of a portion of another embodiment of a front reflector 420. The reflector 420 includes a film 422 and a gain diffuser 424 positioned proximate the film 422. The film 420 can include any film(s) and/or layer(s) described herein regarding front reflectors. The gain diffuser 424 includes a substrate 426 having a first major surface 428 and a second major surface 430, and a plurality of optical elements 432 positioned on or in the second major surface 430 of the substrate 426. Any suitable optical elements 432 can be used, e.g., optical elements 418 of FIG. 4B. The substrate 426 can include any suitable optically transmissive substrate.

For the embodiment illustrated in FIG. 4C, the first major surface 428 of the gain diffuser 424 is positioned proximate the polarizing film 422. The diffuser 424 can be positioned proximate film 422 such that it is spaced apart from the film 422, in contact with the film 422, or attached to the film 422. Any suitable technique can be used to attach the diffuser 424 to the film 422, e.g., the use of optical adhesives. Any suitable gain diffuser can be used for diffuser 424. In some embodiments, the optical elements 432 can be positioned on the first major surface 428 of the substrate 426 such that the elements 432 are between the substrate 426 and the polarizing film 422.

Returning to FIG. 1, the front reflector 120 can also be attached to a supporting layer. The support layer can include any suitable material or materials, e.g., polycarbonate, acrylic, PET, etc. In some embodiments, the front reflector 120 can be supported by a fiber reinforced optical film as described, e.g., in U.S. Patent Publication No. 2006/0257678 (Benson et al.), entitled FIBER REINFORCED OPTICAL FILMS; U.S. patent application Ser. No. 11/323,726 (Wright et al.), entitled REINFORCED REFLECTIVE POLARIZER FILMS; and U.S. patent application Ser. No. 11/322,324 (Ouderkirk et al.), entitled REINFORCED REFLECTIVE POLARIZER FILMS.

Further, the front reflector 120 can be attached to the support layer using any suitable technique. In some embodiments, the front reflector 120 can be adhered to the support layer using an optical adhesive. In other embodiments, the front reflector 120 can be attached to an LC panel of a display system (e.g., LC panel 850 of display system 800 of FIG. 8). In such embodiments, the front reflector 120 can be attached to an absorbing polarizer and then attached to an LC panel, or, alternatively, the absorbing polarizer can first be attached to the LC panel and then the front reflector 120 can be attached to the absorbing polarizer. Further, in non-LCD systems, the front reflector 120 can be attached to a tinted front plate.

As mentioned herein, the front reflector 120 can include any suitable film(s) and/or layer(s) that provide a partially reflective and partially transmissive front reflector. In some embodiments, the front reflector 120 can include one or more fiber polarizing films as described, e.g., in U.S. Patent Publication No. 2006/0193577 (Ouderkirk et al.), entitled REFLECTIVE POLARIZERS CONTAINING POLYMER FIBERS; U.S. patent application Ser. No. 11/468,746 (Ouderkirk et al.), entitled MULTILAYER POLARIZING FIBERS AND POLARIZERS USING SAME; and U.S. patent application Ser. No. 11/468,740 (Bluem et al.), entitled POLYMER FIBER POLARIZERS. Other exemplary films that can be used for the front reflector 120 include cholesteric polarizing films, birefringent pile-of-plates films, birefringent polymer blends (e.g., DRPF, available from 3M Company), and wire grid polarizers.

The films used for the front and back reflectors described herein can be manufactured using any suitable technique. See, e.g., U.S. Pat. No. 6,783,349 (Neavin et al.), entitled APPARATUS FOR MAKING MULTILAYER OPTICAL FILMS.

The front reflector 120 and the back reflector 130 can exhibit any suitable value of $R_{hemi}$. In general, the choice of $R_{hemi}$ for a hollow backlight is influenced by the specific design criteria for a given system. Primary design criteria often include display size (length and width), thickness, source lumens required to achieve a brightness target for a given viewing angle, uniformity of brightness and/or color, and system robustness to variations in light sources, backlight optical materials, or cavity dimensions. Additionally, the ability to space light sources far apart is an important system attribute, as it influences the minimum number of sources that are required, and thus the total cost of sources for the system. Lastly, the desired angular emission from the backlight can influence the choice of $R_{hemi}$, since the angular emission characteristics achievable with polymeric multilayer optical films are dependent on this, with a larger range of angular profiles possible with increasing $R_{hemi}$.

One advantage of a lower $R_{hemi}$ is a higher system efficiency. Generally, the less recycling that occurs, the lower the absorptive losses from multiple reflections in the cavity. Any material in the backlight cavity can absorb light, including the front and back reflectors, the side walls, support structure (e.g. posts), and the light sources themselves. Light can escape through physical gaps in the cavity, or low level transmission through the edge reflectors or back reflector. Reducing the number of reflections reduces these losses, improves system efficiency, and reduces the required source lumens.

In some embodiments, the greater the ratio of cavity length to thickness (e.g., L/H), generally the greater the $R_{hemi}$ required to transport the light within the cavity. Thus for larger and/or thinner backlights, greater $R_{hemi}$ values are generally required to achieve uniformity.

The further apart the desired spacing of the sources, generally the greater the $R_{hemi}$ that is desired so as to minimize non-uniformity between sources (the so-called "head-light effect"). Multiple reflections can help to fill in the darker areas between sources and, in the case of RGB systems, reduce spokes of color by mixing the colors, resulting in a white appearance.

By varying the thickness H, we have shown that for a given L/H, the $R_{hemi}$ required to achieve uniformity can be significantly reduced. This has the advantage of increasing system efficiency and reducing the source lumens required. However, reducing $R_{hemi}$ reduces recycling, resulting in greater sensitivity to manufacturing or component variations. System sensitivity to the following variations increases with decreased recycling: dimensional variation including the varied thickness H, optical variations in reflectance or specularity of the front or back reflectors, discontinuity of side reflectors, visibility of a support structure (e.g., posts), and color and brightness variations of the light sources. In addition to increased sensitivity to the output of the light sources, the system tolerance to in-service drift, differential aging, or failure of the light sources is decreased with a lower $R_{hemi}$.

It is possible to design two systems having two $R_{hemi}$ and the same uniformity (for example, one having a shaped backplane with a low $R_{hemi}$, and the other a straight backplane with a higher $R_{hemi}$) yet the sensitivity of the lower $R_{hemi}$ system can in some embodiments be greater than the higher $R_{hemi}$ system. Here, manufacturability considerations may outweigh the increase in system efficiency obtained by lowering $R_{hemi}$. The choice of $R_{hemi}$ can depend on the specific design criteria for that system.

Other considerations may be a factor in choosing a low $R_{hemi}$ with a non-parallel reflector or reflectors. For example, for some systems the process of shaping one or both of the front and back reflectors may be deemed undesirable from a manufacturing standpoint. Conversely, a shaped reflector can be advantageous since it can provide a space under which to install electronics and thus reduce total system thickness.

In the embodiment illustrated in FIG. 1, the front reflector 120 faces the back reflector 130 to form cavity 102. The back reflector 130 is preferably highly reflective. For example, the back reflector 130 can have an on-axis average reflectivity for visible light emitted by the light sources of at least 90%, 95%, 98%, 99%, or more for visible light of any polarization. Such reflectivity values also can reduce the amount of loss in a highly recycling cavity. Further, such reflectivity values encompass all visible light reflected into a hemisphere, i.e., such values include both specular and diffuse reflections.

The back reflector 130 can be a predominantly specular, diffuse, or combination specular/diffuse reflector, whether spatially uniform or patterned. In some embodiments, the back reflector 130 can be a semi-specular reflector as is further described herein. See also U.S. Patent Application No. 60/939,085, entitled RECYCLING BACKLIGHTS WITH SEMI-SPECULAR COMPONENTS; and U.S. patent application Ser. No. 11/467,326 (Ma et al.), entitled BACKLIGHT SUITABLE FOR DISPLAY DEVICES. In some cases, the back reflector 130 can be made from a stiff metal substrate with a high reflectivity coating, or a high reflectivity film laminated to a supporting substrate. Suitable high reflectivity materials include Vikuiti™ Enhanced Specular Reflector (ESR) multilayer polymeric film (available from 3M Company); a film made by laminating a barium sulfate-loaded polyethylene terephthalate film (2 mils thick) to Vikuiti™ ESR film using a 0.4 mil thick isooctylacrylate acrylic acid pressure sensitive adhesive, the resulting laminate film referred to herein as "EDR II" film; E-60 series Lumirror™ polyester film available from Toray Industries, Inc.; porous polytetrafluoroethylene (PTFE) films, such as those available from W. L. Gore & Associates, Inc.; Spectralon™ reflectance material available from Labsphere, Inc.; Miro™ anodized aluminum films (including Miro™ 2 film) available from Alanod Aluminum-Veredlung GmbH & Co.; MCPET high reflectivity foamed sheeting from Furukawa Electric Co., Ltd.; White Refstar™ films and MT films available from Mitsui Chemicals, Inc.; and 2×TIPS (i.e., a porous polypropylene film having a high reflectivity and can be made using thermally induced phase separation as described, e.g., in U.S. Pat. No. 5,976,686 (Kaytor et al.). Two sheets of TIPS can be laminated together using an optical adhesive to form a laminate).

The back reflector 130 can be substantially flat and smooth, or it may have a structured surface associated with it to enhance light scattering or mixing. Such a structured surface can be imparted (a) on the surface of the back reflector 130, or (b) on a transparent coating applied to the surface. In the former case, a highly reflecting film may be laminated to a substrate in which a structured surface was previously formed, or a highly reflecting film may be laminated to a flat substrate (such as a thin metal sheet, as with Vikuiti™ Durable Enhanced Specular Reflector-Metal (DESR-M) reflector available from 3M Company) followed by forming the structured surface, such as with a stamping operation. In the latter case, a transparent film having a structured surface can be laminated to a flat reflective surface, or a transparent film can be applied to the reflector and then afterwards a structured surface imparted to the top of the transparent film.

For those embodiments that include a direct-lit configuration (e.g., backlight 700 of FIG. 7), the back reflector 130 can be a continuous unitary (and unbroken) layer on which the light source(s) are mounted, or it can be constructed discontinuously in separate pieces, or discontinuously insofar as it includes isolated apertures, through which light sources can protrude, in an otherwise continuous layer. For example, strips of reflective material can be applied to a substrate on which rows of LEDs are mounted, each strip having a width sufficient to extend from one row of LEDs to another and having a length dimension sufficient to span between opposed borders of the backlight's output area.

In the embodiment illustrated in FIG. 1, the back reflector 130 is a non-planar reflector. First portion 132 and third portion 136 of the back reflector 130 are substantially parallel to front reflector 120, while a second portion 134 is substantially non-parallel to the front reflector 120. The back reflector 130 can take an suitable shape to provide a desired output light flux distribution as is further described herein. For example, the first, second, and third portions 132, 134, 136 can be of any suitable length taken in the plane of FIG. 1. In other embodiments, the back reflector 130 can include a first portion that is substantially parallel to the front reflector, and a second portion that is not substantially parallel to the front reflector, and no third portion. Alternatively, the back reflector 130 can include any number of portions that are parallel and any number of portions that are non-parallel to the front reflector 120. Portions 132, 134, 136 can be any suitable shape, e.g., planar, curved, faceted, etc. Further, non-parallel portions of the back reflector 130 can include any suitable percentage of the total surface area (L×W) of the back reflector. For example, in some embodiments, the non-parallel portion 134 can be at least 10%, 20%, 30%, 40%, 50% or more of the total surface area of the back reflector 130.

Although backlight 100 of FIG. 1 is depicted as having a non-planar back reflector 130 such that H varies across the cavity 102, in some embodiments, both the front and back reflectors can be planar, and H can be varied by positioning the front and back reflectors such that they are non-parallel. For example, a planar front reflector and a planar back reflector can be positioned to form a wedge-shaped cavity, where the front and back reflectors converge in a direction away from the light sources. In such an embodiment, the non-parallel portion of the back reflector 130 can be about 100% of the total surface area of the back reflector.

In the embodiment illustrated in FIG. 1, a distance H measured between the front reflector 120 and the back reflector 130 taken normal to the output surface 104 varies along a length L of the light recycling cavity 102, i.e., in a direction away from the one or more light sources 140. The distance H, however, remains substantially constant in a width W into the plane of the figure, i.e., in a direction that is orthogonal to length L. In other embodiments, H can vary in direction W and remain constant in direction L; alternatively, H can vary in both directions L and W as is further described herein.

In the embodiment illustrated in FIG. 1, H is at a maximum proximate edge region 106 of the light recycling cavity 102. Edge region 106 is proximate the one or more light sources 140. Further, H is at a minimum proximate edge region 110 of the light recycling cavity 102.

Any suitable technique can be utilized to provide the non-planar back reflector 130. For example, a planar back reflector can be made non-planar, e.g., by bending, stamping, forming, thermoforming, etc. In some embodiments, one or more structures can be placed on the back reflector to provide an overall non-planar back reflector. For example, the back reflector can include a substrate and one or more mechanical supports placed on the substrate. Such mechanical supports can include any suitable material or materials, e.g., molded plastic structures, posts, rods attached to one or more edges of the backlight, etc. A reflective film or layer (e.g., ESR) can then be placed over the substrate and structures to form the non-planar back reflector. The space between the front back reflectors can be maintained using any suitable techniques, e.g., a rigid plates, tensioning frames, and various structures in the cavity, including posts, walls, or protrusions extending from the back reflector such as bumps or ridges.

The backlight 100 can also include one or more side reflectors 112 located along at least a portion of the outer boundary of the backlight 100 that are preferably lined or otherwise provided with high reflectivity vertical walls to reduce light loss and improve recycling efficiency. The same reflective material used for the back reflector 130 can be used to form these walls, or a different reflective material can be used. In some embodiments, the side reflectors 112 and back reflector 130 can be formed from a single sheet of material. One or both of the side reflectors and walls can be vertical, or, alternatively, the side reflectors can be tilted, curved, or structured. Refractive structures can be used on or adjacent to the side reflectors to achieve a desired reflection profile. Wall material and inclination can be chosen to adjust the output light flux distribution.

The backlight 100 also includes one or more light sources 140 disposed to emit light into the light recycling cavity 102. In this embodiment, the light sources are positioned proximate edge 114 of backlight 100. The light sources 140 are shown schematically. In most cases, these sources 140 are compact light emitting diodes (LEDs). In this regard, "LED" refers to a diode that emits light, whether visible, ultraviolet, or infrared. It includes incoherent encased or encapsulated semiconductor devices marketed as "LEDs", whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light. An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. More discussion of packaged LEDs, including forward-emitting and side-emitting LEDs, is provided herein.

Multicolored light sources, whether or not used to create white light, can take many forms in a backlight, with different effects on color and brightness uniformity of the backlight output area. In one approach, multiple LED dies (e.g., a red, a green, and a blue light emitting die) are all mounted in close proximity to each other on a lead frame or other substrate, and then encased together in a single encapsulant material to form a single package, which may also include a single lens component. Such a source can be controlled to emit any one of the individual colors, or all colors simultaneously. In another approach, individually packaged LEDs, with only one LED die and one emitted color per package, can be clustered together for a given recycling cavity, the cluster containing a combination of packaged LEDs emitting different colors such as blue/yellow or red/green/blue. In still another approach, such individually packaged multicolored LEDs can be positioned in one or more lines, arrays, or other patterns.

If desired, other visible light emitters such as linear cold cathode fluorescent lamps (CCFLs) or hot cathode fluorescent lamps (HCFLs) can be used instead of or in addition to discrete LED sources as illumination sources for the disclosed backlights. In addition, hybrid systems such as, for example, (CCFL/LED), including cool white and warm white, CCFL/HCFL, such as those that emit different spectra, may be used. Other suitable light sources include Xe CCFLs, flat fluorescent lamps, field emission sources, photonic lattice sources, vertical cavity surface emitting lasers, external electrode fluorescent lamps, and organic light emitting diodes. The combinations of light emitters may vary widely, and include LEDs and CCFLs, and pluralities such as, for example, multiple CCFLs, multiple CCFLs of different colors, and LEDs and CCFLs.

For example, in some applications it may be desirable to replace the row of discrete light sources with a different light source such as a long cylindrical CCFL, or with a linear surface emitting light guide emitting light along its length and coupled to a remote active component (such as an LED die or halogen bulb), and to do likewise with other rows of sources. Examples of such linear surface emitting light guides are disclosed in U.S. Pat. No. 5,845,038 (Lundin et al.) and U.S. Pat. No. 6,367,941 (Lea et al.). Fiber-coupled laser diode and other semiconductor emitters are also known, and in those cases the output end of the fiber optic waveguide can be considered to be a light source with respect to its placement in the disclosed recycling cavities or otherwise behind the output area of the backlight. The same is also true of other passive optical components having small emitting areas such as lenses, deflectors, narrow light guides, and the like that give off light received from an active component such as a bulb or LED die. One example of such a passive component is a molded encapsulant or lens of a side-emitting packaged LED.

Any suitable side-emitting LED can be used for one or more light sources, e.g., Luxeon™ LEDs (available from Lumileds, San Jose, Calif.), or the LEDs described, e.g., in U.S. patent application Ser. No. 11/381,324 (Leatherdale et al.), entitled LED PACKAGE WITH CONVERGING OPTICAL ELEMENT; and U.S. patent application Ser. No. 11/381,293 (Lu et al.), entitled LED PACKAGE WITH WEDGE-SHAPED OPTICAL ELEMENT.

In some embodiments where the backlights are used in combination with a display panel (e.g., panel 850 of FIG. 8), the backlight 100 continuously emits white light, and the LC panel is combined with a color filter matrix to form groups of multicolored pixels (such as yellow/blue (YB) pixels, red/green/blue (RGB) pixels, red/green/blue/white (RGBW) pixels, red/yellow/green/blue (RYGB) pixels, red/yellow/green/cyan/blue (RYGCB) pixels, or the like) so that the displayed image is polychromatic. Alternatively, polychromatic images can be displayed using color sequential techniques, where, instead of continuously back-illuminating the LC panel with white light and modulating groups of multicolored pixels in the LC panel to produce color, separate differently colored light sources within the backlight 100 (selected, for example, from red, orange, amber, yellow, green, cyan, blue (including royal blue), and white in combinations such as those mentioned above) are modulated such that the backlight flashes a spatially uniform colored light output (such as, for example, red, then green, then blue) in rapid repeating succession. This color-modulated backlight is then combined with a display module that has only one pixel array (without any color filter matrix), the pixel array being modulated synchronously with the backlight to produce the whole gamut of achievable colors (given the light sources used in the backlight) over the entire pixel array, provided the modulation is fast enough to yield temporal color-mixing in the visual system of the observer. Examples of color sequential displays, also known as field sequential displays, are described in U.S. Pat. No. 5,337,068 (Stewart et al.) and U.S. Pat. No. 6,762,743 (Yoshihara et al.). In some cases, it may be desirable to provide only a monochrome display. In those cases the backlight 100 can include filters or specific sources that emit predominantly in one visible wavelength or color.

Figure 7:
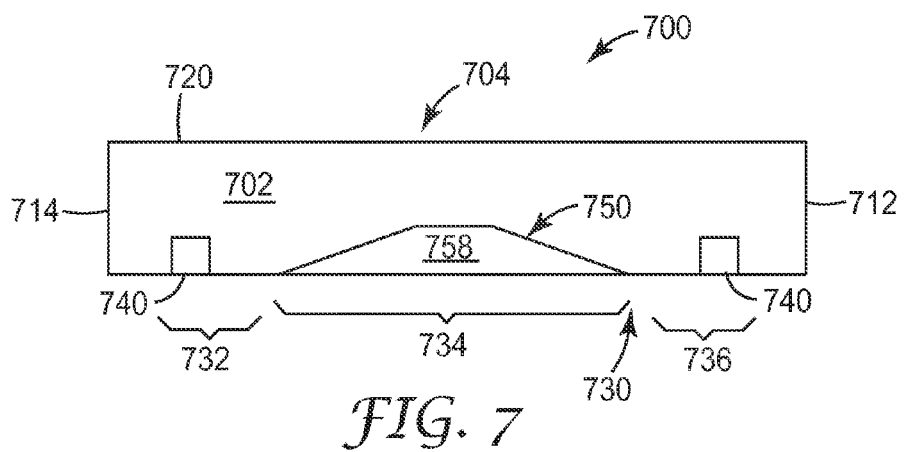
FIG. 7 is a schematic cross-section view of one embodiment of a direct-lit hollow backlight.

In some embodiments, e.g., direct-lit backlights such as the embodiment illustrated in FIG. 7, the light sources may be positioned on the back reflector; alternatively, the light sources may be spaced apart from the back reflector. In other embodiments, the light sources may include light sources that are positioned on or attached to the back reflector, e.g., as described in co-owned and copending U.S. patent application Ser. Nos. 11/018,608; 11/018,605; 11/018,961; and 10/858,539.

The light sources 140 may be positioned in any suitable arrangement. Further, the light sources 140 can include light sources that emit different wavelengths or colors of light. For example, the light sources may include a first light source that emits a first wavelength of illumination light, and a second light source that emits a second wavelength of illumination light. The first wavelength may be the same as or different from the second wavelength. The light sources 140 can also include a third light source that emits a third wavelength of light. See, e.g., U.S. Patent Application No. 60/939,083, entitled WHITE LIGHT BACKLIGHTS AND THE LIKE WITH EFFICIENT UTILIZATION OF COLORED LED SOURCES. In some embodiments, the various light sources 140 may produce light that, when mixed, provides white illumination light to a display panel or other device. In other embodiments, the light sources 140 may each produce white light.

Further, in some embodiments, light sources that at least partially collimate the emitted light may be preferred. Such light sources can include lenses, extractors, shaped encapsulants, or combinations thereof of optical elements to provide a desired output into the hollow light recycling cavity of the disclosed backlights. Exemplary extractors are described, e.g., in U.S. Patent Publication Nos. 2007/0257266; 2007/0257270; 2007/0258241; 2007/0258246; and U.S. Pat. No. 7,329,982.

Further, the backlights of the present disclosure can include injection optics that partially collimate or confine light initially injected into the recycling cavity to propagation directions close to a transverse plane (the transverse plane being parallel to the output area of the backlight), e.g., an injection beam having an average deviation angle from the transverse plane in a range from 0 to 45 degrees, or 0 to 30 degrees, or 0 to 15 degrees.

In some embodiments of the present disclosure it may be preferred that some degree of diffusion be provided within the hollow light recycling cavity. Such diffusion can provide more angular mixing of light within the cavity, thereby helping to spread the light within the cavity and provide greater uniformity in the light directed out of the cavity through the output surface. In other words, the recycling optical cavity contains a component that provides the cavity with a balance of specular and diffuse characteristics, the component having sufficient specularity to support significant lateral light transport or mixing within the cavity, but also having sufficient diffusivity to substantially homogenize the angular distribution of steady state light propagation within the cavity, even when injecting light into the cavity only over a narrow range of propagation angles. Additionally, recycling within the cavity must result in a degree of randomization of reflected light polarization relative to the incident light polarization state. This allows for a mechanism by which unusable polarization light can be converted by recycling into usable polarization light. The diffusion can be provided by one or both of the front and back reflectors, the side reflectors, or by one or more layers positioned between the front and back reflectors as is further described herein.

In some embodiments, the diffusion provided within the cavity can include semi-specular diffusion. As used herein, the term "semi-specular reflector" refers to a reflector that reflects substantially more forward scattering than reverse scattering. Similarly, the term "semi-specular diffuser" refers to a diffuser that does not reverse the normal component of the incident ray for a substantial majority of the incident light, i.e., the light is substantially transmitted in the forward (z) direction and scattered to some degree in the x and y directions. In other words, semi-specular reflectors and diffusers (collectively referred to as semi-specular elements) direct the light in a substantially forward direction and thus are very different from Lambertian components which redirect light rays equally in all directions. Semi-specular reflectors and diffusers can exhibit relatively wide scattering angles; alternatively, such reflectors and diffusers can exhibit only small amounts of light deflection outside the specular direction. See, e.g., U.S. Patent Application No. 60/939,085, entitled RECYCLING BACKLIGHTS WITH SEMI-SPECULAR COMPONENTS. Any suitable semi-specular material or materials can be used for the front and back reflectors of the present disclosure.

Further, for example, the semi-specular back reflectors can include a partially transmitting specular reflector on a high reflectance diffuser reflector. Suitable partially transmitting specular reflectors include any of the partially transmitting reflective films described herein, e.g., symmetric or asymmetric reflective films. Suitable high reflectance diffuse reflectors include EDR II film (available from 3M); porous polytetrafluoroethylene (PTFE) films, such as those available from W. L. Gore & Associates, Inc.; Spectralon™ reflectance material available from Labsphere, Inc.; MCPET high reflectivity foamed sheeting from Furukawa Electric Co., Ltd.; and White Refstar™ film available from Mitsui Chemicals, Inc.

In other embodiments, a semi-specular back reflector can include a partial Lambertian diffuser on a high reflectance specular reflector. Alternatively, a forward scattering diffuser on a high reflectance specular reflector can provide a semi-specular back reflector.

The front reflector can be made semi-specular with constructions that are similar to the back reflector. For example, a partial reflecting Lambertian diffuser can be combined with a partial specular reflector. Alternatively, a forward scattering diffuser can be combined with a partial specular reflector. Further, the front reflector can include a forward scattering partial reflector. In other embodiments, any of the above-described front reflectors can be combined to provide a semi-specular front reflector.

One or both of the front and back reflectors can be specular if a diffuser is placed somewhere in the cavity. One of the reflectors can also be Lambertian, but in general this is not an optimum construction, particularly for edge-lit backlights. In this case, the other reflector should be semi-specular or specular. The forward scattering diffusers can be any suitable diffuser and can be symmetric or asymmetric with respect to both direction or polarization state.

Quantitatively, the degree of semi-specularity (specular vs. Lambertian characteristic of a given reflector or other component) can be effectively characterized by comparing the fluxes of the forward- and back-scattered light components, referred to as F and B respectively. The forward and back-scattered fluxes can be obtained from the integrated reflection intensities (or integrated transmission intensities in the case of optically transmissive components) over all solid angles. The degree of semi-specularity can then be characterized by a "transport ratio" T, given by: $T=(F-B)/(F+B)$.

T ranges from 0 to 1 as one moves from purely Lambertian to purely specular. For a pure specular reflector there is no back-scatter (B=0), and therefore $T=F/F=1$. For a pure Lambertian reflector, the forward- and back-scattered fluxes are the same (F=B), and thus T=0. Examples with experimentally measured values are given below. The transport ratio for any real reflective or transmissive component is a function of incidence angle. This is logical, because one would expect the amount of forward-scattered light, for example, to be different for a near-normally incident ray than for a grazing-incident ray.

In connection with a recycling cavity, one can define an "effective cavity transport ratio", i.e., the transport ratio experienced by a given incident ray after a complete circuit or cycle of the recycling cavity. This quantity may be of interest, particularly in cavities that contain at least one semi-specular component and at least one additional scattering component (whether semi-specular or Lambertian). Since transport ratio is in general a function of incidence angle, one could evaluate or specify the effective cavity transport ratio in terms of a characteristic or average incidence angle of light injected into the cavity, e.g., the average power flux deviation angle of the light source(s). See, e.g., U.S. Patent Application No. 60/939,085 for further discussion of transport ratio.

Although not shown in FIG. 1, the backlight 100 (or display system 800 of FIG. 8) can include a light sensor and feedback system to detect and control one or both of the brightness and color of light from the light sources 140. For example, a sensor can be located near individual light sources 140 or clusters of sources to monitor output and provide feedback to control, maintain, or adjust a white point or color temperature. It may be beneficial to locate one or more sensors along an edge or within the cavity 102 to sample the mixed light. In some instances it may be beneficial to provide a sensor to detect ambient light outside the display in the viewing environment, for example, the room that the display is in. Control logic can be used to appropriately adjust the output of the light sources 140 based on ambient viewing conditions. Any suitable sensor or sensors can be used, e.g., light-to-frequency or light-to-voltage sensors (available from Texas Advanced Optoelectronic Solutions, Plano, Tex.). Additionally, thermal sensors can be used to monitor and control the output of light sources 140. Any of these techniques can be used to adjust light output based on operating conditions and compensation for component aging over time. Further, sensors can be used for dynamic contrast, vertical scanning or horizontal zones, or field sequential systems to supply feedback signals to the control system.

The output surface 104 of the backlight 100 can include any suitable area in relation to the area of the cavity 102. For example, in some embodiments, the output surface 104 can be smaller in area than the area (L×W) of the cavity 102. This can be accomplished, e.g., using a front reflector 120 that has a portion that is highly reflective, thereby reducing the effective area of the output surface 104. A reduced output surface area can increase the brightness provided by the backlight for a given input flux from the light sources 140.

Figure 2:
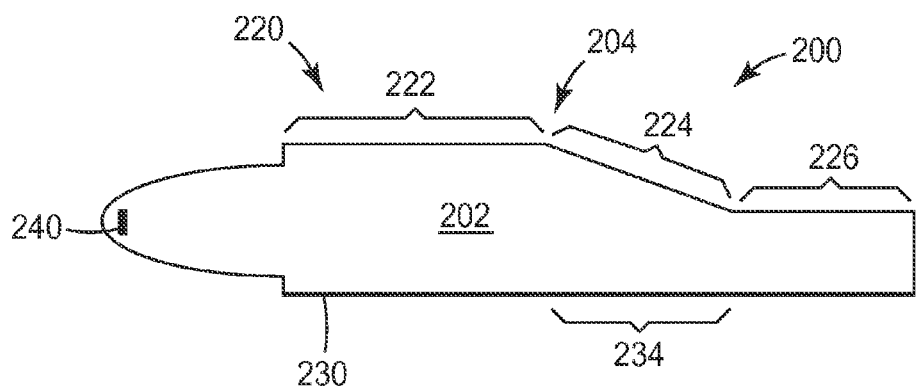
FIG. 2 is a schematic cross-section view of another embodiment of an edge-lit hollow backlight.

Although back reflector 130 is shaped (or positioned) to provide one or more portions that are non-parallel to the front reflector 120, in other embodiments, the front reflector can be shaped to provide a non-parallel relationship with a portion of the back reflector. For example, FIG. 2 is a schematic cross-section view of another embodiment of a backlight 200. The backlight 200 includes a partially transmissive front reflector 220, and a back reflector 230. The front reflector 220 and back reflector 230 form a hollow light recycling cavity 202 that includes an output surface 204. The cavity 202 includes a semi-specular element (not shown). The backlight also includes one or more light sources 240 disposed to emit light into the light recycling cavity 202. The one or more light sources 240 are configured to emit light into the light recycling cavity over a limited angular range. All of the design considerations and possibilities described herein regarding the front reflector 120, the back reflector 130, the semi-specular element, and the one or more light sources 140 of the backlight 100 of FIG. 1 apply equally to the front reflector 220, the back reflector 230, the semi-specular element, and the one or more light sources 240 of the backlight 200 of FIG. 2.

In this embodiment, the front reflector 220 is non-planar and includes first and third portions 222, 226 that are substantially parallel to the back reflector 230, and a second portion 224 that is not substantially parallel to the back reflector 230. The second portion 224 slopes in a direction toward the back reflector 230. In embodiments that include a non-planar front reflector, the output surface is defined as lying in a transverse plane that is orthogonal to one or more edges of the hollow light recycling cavity and positioned proximate the front reflector external to the cavity. Portion 224 of the front reflector 220 is shaped such that portion 234 of the back reflector 230 is non-parallel to the front reflector 220. In some embodiments, both the front and back reflectors 220, 230 can be shaped to provide similar non-parallel relationships.

Figure 3:
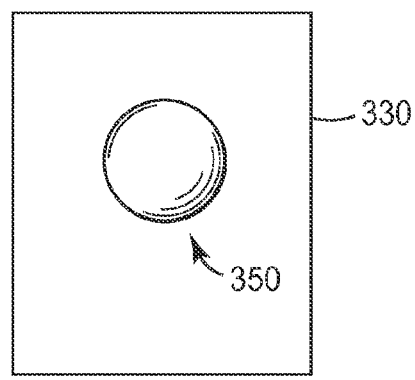
FIG. 3 is a schematic plan view of a portion of a non-planar back reflector.

The one or more structures formed in or on one or both of the front and back reflectors provide non-planar reflectors that can take any suitable shape to provide a desired output light flux distribution. In some embodiments, the structures can include curvature in more than one plane. For example, FIG. 3 is a schematic plan view of a portion of a back reflector 330. The back reflector 330 is non-planar and includes a structure 350 that is hemispherical in shape. The structure 350 includes curvature in two different orthogonal planes. In some embodiments, structure 350 can include a concave shape facing away from the back reflector. In other embodiments, structure 350 can be concave facing toward the back reflector.

In general, the front and back reflectors of the present disclosure can include one, two, or more structures. For example, in some embodiments, the back reflector can include nine hemispherical structures (e.g., structure 350) positioned to correspond to the VESA 9 standard. See, e.g., co-owned U.S. Patent Application No. 60/939,079 for a general description of the VESA 9 standard.

Figure 5:
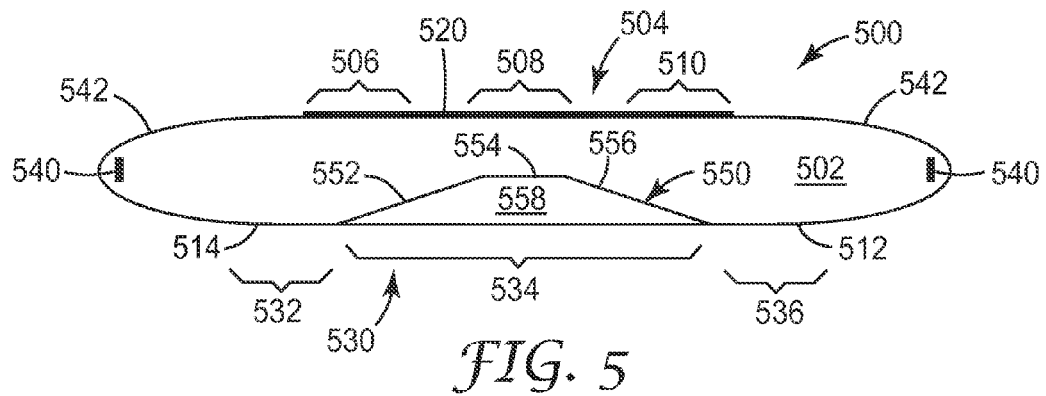
FIG. 5 is a schematic cross-section view of another embodiment of an edge-lit hollow backlight.

As mentioned herein, some backlights of the present disclosure can include one or more light sources positioned at one or more edges of the backlight to form an edge-lit backlight. For example, FIG. 5 is a schematic cross-section view of another embodiment of an edge-lit backlight 500. The backlight 500 includes a partially transmissive front reflector 520 and a non-planar back reflector 530 that form a hollow light recycling cavity 502 that includes an output surface 504. The backlight 500 also includes at least one semi-specular element disposed within the hollow light recycling cavity (not shown), and one or more light sources 540 disposed to emit light into the light recycling cavity 502. The one or more light sources are configured to emit light into the light recycling cavity 502 over a limited angular range. All of the design considerations and possibilities described herein regarding the front reflector 120, back reflector 130, semi-specular element, and one or more light sources 140 of backlight 100 of FIG. 1 apply equally to the front reflector 520, the back reflector 530, the semi-specular element, and the one or more light sources 540 of the backlight 500 of FIG. 5.

In the embodiment illustrated in FIG. 5, the one or more light sources 540 are disposed proximate first edge 512 and second edge 514 of the backlight 500. In other embodiments, light sources can be disposed proximate any number of edges of the backlight.

In the illustrated embodiment, the back reflector 530 is non-planar and includes first and third portions 532, 536 that are substantially parallel to the front reflector 520, and a second portion 534 that includes structure 550 having features that are non-parallel to the front reflector 520. The structure 550 has sloping sides 552, 556 that are contiguous with a plateau 554. The sloping sides 552, 556 redirect light such that at least a portion of light that is in the transport zone is converted to light propagating within the transmission zone. Further, the plateau 554 can also increase the rate of conversion of light from the transport zone to the transmission zone because of the decreased distance H between the front and back reflectors 520, 530 proximate the plateau 554. In some embodiments, structure 550 of back reflector 530 can provide an output light flux distribution that is generally greater proximate a center region 508 than proximate edge regions 506, 510. The structure 550 can take any suitable shape or dimension within the backlight 500. The structure 550 forms cavity 558 that can be hollow or filled. In embodiments where cavity 558 is hollow, one or more backlight elements and devices can be placed within the cavity 558, e.g., electrical conductors, thermal conductors, drive circuitry, controllers, wireless communication devices, tuners, fans, power supplies, video circuit boards, sensors, connectors, and air ducts.

In some embodiments, the cavity 558 can act as an air flow pathway for thermal transfer from the light sources 540 to thermal conductors positioned in or proximate the cavity 558.

The structure 550 can either be formed in the back reflector 530 or placed on the back reflector 530. Any suitable technique can be used to form the structure 550.

Figure 6:
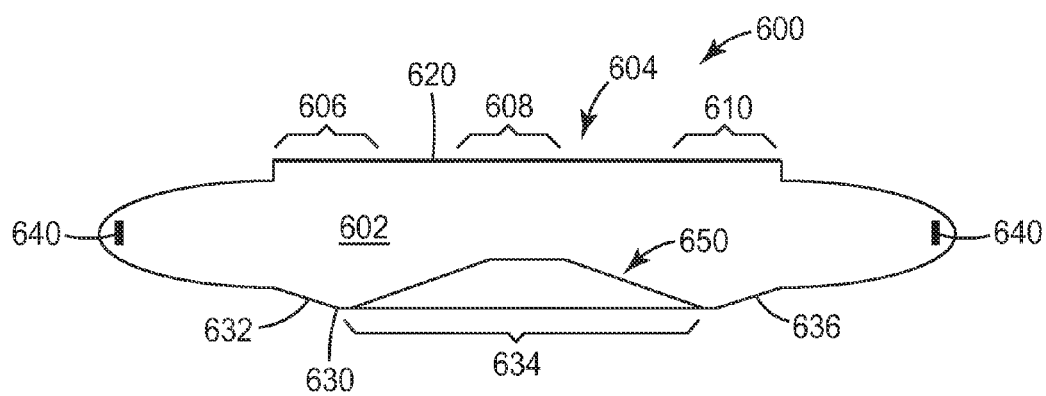
FIG. 6 is a schematic cross-section view of another embodiment of an edge-lit hollow backlight.

In other embodiments, one or both of the front and back reflectors can include portions that slope both toward and away from the facing reflector. In general, structures having portions that slope away from the opposing reflector will tend to decrease the rate of conversion of light from the transport zone to the transmission zone. For example, FIG. 6 is a schematic cross-section view of one embodiment of a backlight 600 that includes a non-planar back reflector 630 having structures that slope both toward and away from a front reflector 620. The backlight 600 includes a partially transmissive front reflector 620 and a non-planar back reflector 630 that form a hollow light recycling cavity 602 having an output surface 604. The backlight 600 also includes at least one semi-specular element (not shown) disposed within the hollow light recycling cavity 602. One or more light sources 640 are disposed to emit light into the light recycling cavity 602. The one or more light sources 640 are configured to emit light into the light recycling cavity over a limited angular range. All of the design considerations and possibilities described herein regarding the front reflector 120, the back reflector 130, the at least one semi-specular element, and the one or more light sources 140 of the backlight 100 of FIG. 1 apply equally to the front reflector 620, the back reflector 630, the at least one semi-specular element, and the one or more light sources 640 of the backlight 600 of FIG. 6.

The non-planar back reflector 630 includes first and third portions 632, 636 that slope away from the front reflector 620, and a second portion 634 that includes structure 650. The first and third portions 632, 636 are non-parallel to the front reflector 620. The structure 650 can be any suitable structure or structures described herein, e.g., structure 550 of FIG. 5. Portions 632, 636 of back reflector 630 are operable to convert incident light from the transmission zone to the transport zone, thereby reducing the amount of light that can be transmitted through the front reflector proximate edge regions 606, 610 of the output surface 604. On the other hand, structure 650 is operable to convert incident light from the transport zone to the transmission zone such that a greater amount of light is transmitted through the front reflector 620 proximate a center region 608 of the output surface 604. As a result, the backlight 600 is configured to provide an output light flux distribution that is greater proximate the center region 608 than at the edge regions 606, 610. This type of light flux distribution may be desirable in certain applications, e.g., LC displays, monitors, etc.

Although backlight 600 of FIG. 6 is an edge-lit backlight having one or more light sources positioned proximate edges of the backlight, other embodiments can include light sources positioned to direct light into the light recycling cavity within the area of cavity defined by the projection of the output surface onto the back reflector, thereby forming a direct-lit backlight. For example, FIG. 7 is a schematic cross-section view of one embodiment of a direct-lit backlight 700. The backlight 700 includes a partially transmissive front reflector 720 and a non-planar back reflector 730 that form a hollow light recycling cavity 702 having an output surface 704. The backlight 700 also includes at least one semi-specular element (not shown) disposed within the hollow light recycling cavity 702, and one or more light sources 740 disposed to emit light into the light recycling cavity 702. All of the design considerations and possibilities described herein regarding the front reflector 120, the back reflector 130, the at least one semi-specular element, and the one or more light sources 140 of the backlight 100 of FIG. 1 apply equally to the front reflector 720, the back reflector 730, the at least one semi-specular element, and the one or more light sources 740 of the backlight 700 of FIG. 7.

In the embodiment illustrated in FIG. 7, the one or more light sources 740 are positioned within the light recycling cavity 702. In some embodiments, the light sources 740 are configured to emit light in a substantially sideways direction such that the emitted light has an average flux deviation angle relative to a transverse plane defined by the output surface 704 in a range of 0 to 40 degrees. In other words, the light sources 740 can be configured to emit a substantial portion of light into the transport zone of the cavity 702.

The one or more light sources 740 can be positioned in any suitable location within the cavity 702. In some embodiments, one or more light sources can be positioned on or in structure 750, with circuitry for the light sources optionally positioned within cavity 758.

In some direct-lit embodiments, generally vertical reflective side surfaces may actually be thin partitions that separate the backlight from similar or identical neighboring backlights, where each such backlight is actually a portion of a larger zoned backlight. Light sources in the individual sub-backlights can be turned on or off in any desired combination to provide patterns of illuminated and darkened zones for the larger backlight. Such zoned backlighting can be used dynamically to improve contrast and save energy in some LCD applications. The reflective partitions between zones may not extend completely to the front reflector, but may be separated therefrom by a gap that is sized to minimize the visibility of zone boundaries (from the perspective of a viewer) while also minimizing zone-to-zone bleedthrough.

Figure 8:
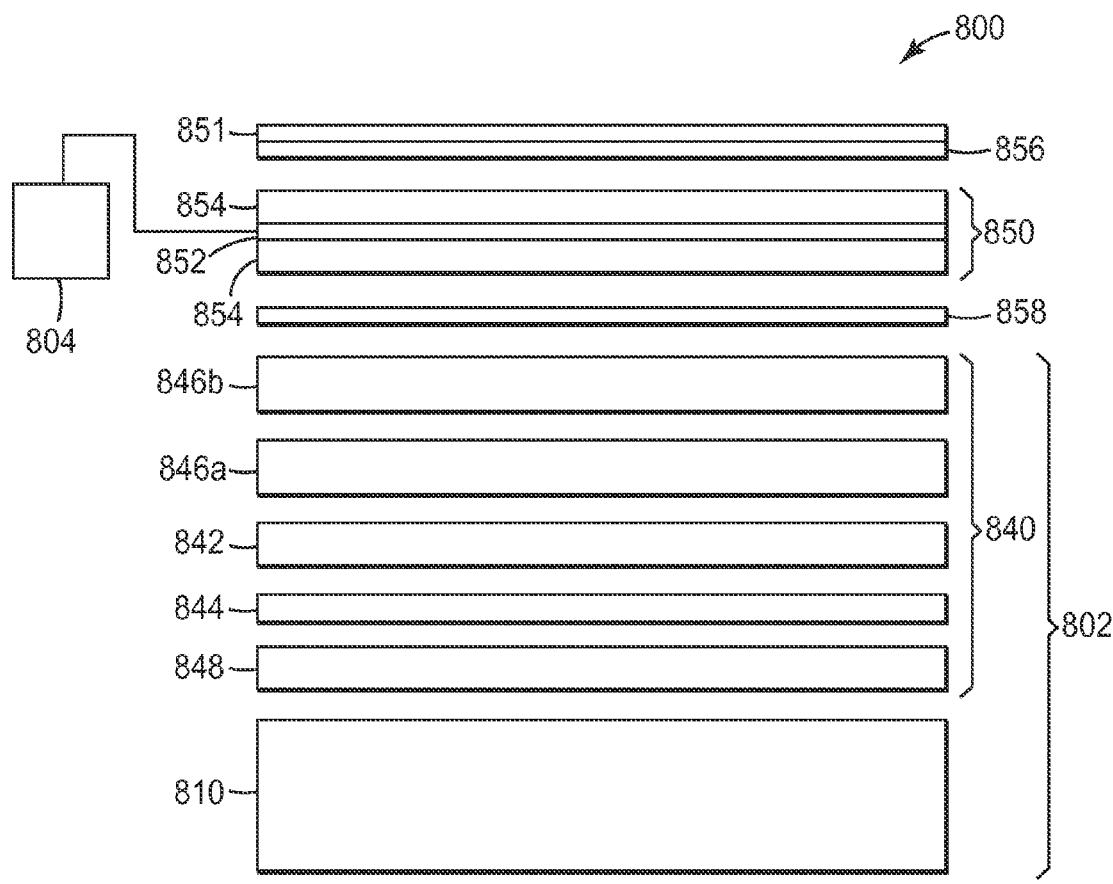
FIG. 8 is a schematic cross-section view of one embodiment of a display system.

The backlights of the present disclosure can be implemented in any suitable configuration or application. For example, the backlights described herein can be used with a display panel to form a display system, e.g., an LC display or monitor. FIG. 8 is a schematic cross-section view of one embodiment of a display system 800. The display system 800 includes an LC panel 850 and an illumination assembly 802 disposed to provide light to the LC panel 850. The LC panel 850 typically includes a layer of LC 852 disposed between panel plates 854. The plates 854 are often formed of glass and may include electrode structures and alignment layers on their inner surfaces for controlling the orientation of the liquid crystals in the LC layer 852. These electrode structures are commonly arranged so as to define LC panel pixels, i.e., areas of the LC layer where the orientation of the liquid crystals can be controlled independently of adjacent areas. A color filter may also be included with one or more of the plates 852 for imposing color on the image displayed by the LC panel 850.

The LC panel 850 is positioned between an upper absorbing polarizer 856 and a lower absorbing polarizer 858. In the illustrated embodiment, the upper and lower absorbing polarizers 856, 858 are located outside the LC panel 850. The absorbing polarizers 856, 858 and the LC panel 850 in combination control the transmission of light from a backlight 810 through the display system 800 to the viewer. For example, the absorbing polarizers 856, 858 may be arranged with their transmission axes perpendicular to each other. In an unactivated state, a pixel of the LC layer 852 may not change the polarization of light passing therethrough. Accordingly, light that passes through the lower absorbing polarizer 858 is absorbed by the upper absorbing polarizer 856. When the pixel is activated, the polarization of the light passing therethrough is rotated so that at least some of the light that is transmitted through the lower absorbing polarizer 858 is also transmitted through the upper absorbing polarizer 856. Selective activation of the different pixels of the LC layer 852, for example, by a controller 804, results in the light passing out of the display system 800 at certain desired locations, thus forming an image seen by the viewer. The controller 804 may include, for example, a computer or a television controller that receives and displays television images.

One or more optional layers 857 may be provided proximate the upper absorbing polarizer 856, for example, to provide mechanical and/or environmental protection to the display surface. In one exemplary embodiment, the layer 857 may include a hardcoat over the upper absorbing polarizer 856.

It will be appreciated that some types of LC displays may operate in a manner different from that described above. For example, the absorbing polarizers may be aligned parallel and the LC panel may rotate the polarization of the light when in an unactivated state. Regardless, the basic structure of such displays remains similar to that described above.

The illumination assembly 802 includes a backlight 810 and optionally one or more light management films 840 positioned between the backlight 810 and the LC panel 850. The backlight 810 can include any backlight described herein, e.g., backlight 100 of FIG. 1.

An arrangement 840 of light management films, which may also be referred to as a light management unit, is positioned between the backlight 810 and the LC panel 850. The light management films 840 affect the illumination light propagating from the backlight 810. For example, the arrangement 840 of light management films may optionally include a diffuser 848. The diffuser 848 is used to diffuse the light received from the backlight 810.

The diffuser layer 848 may be any suitable diffuser film or plate. For example, the diffuser layer 848 can include any suitable diffusing material or materials. In some embodiments, the diffuser layer 848 may include a polymeric matrix of polymethyl methacrylate (PMMA) with a variety of dispersed phases that include glass, polystyrene beads, and CaCO$_3$ particles. Exemplary diffusers can include 3M™ Scotchcal™ Diffuser Film, types 3635-30, 3635-70, and 3635-100, available from 3M Company, St. Paul, Minn.

The optional light management unit 840 may also include a reflective polarizer 842. In some embodiments, the transmission axis of the reflective polarizer 842 can be aligned with the pass axis of the LC panel 850. Any suitable type of reflective polarizer may be used for the reflective polarizer 842, e.g., multilayer optical film (MOF) reflective polarizers; diffusely reflective polarizing film (DRPF), such as continuous/disperse phase polarizers; wire grid reflective polarizers; or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774 (Jonza et al.). Commercially available examples of MOF reflective polarizers include Vikuiti™ DBEF-D200 and DBEF-D440 multilayer reflective polarizers that include diffusive surfaces, available from 3M Company.

Examples of DRPF useful in connection with the present disclosure include continuous/disperse phase reflective polarizers as described, e.g., in co-owned U.S. Pat. No. 5,825,543 (Ouderkirk et al.), and diffusely reflecting multilayer polarizers as described, e.g., in co-owned U.S. Pat. No. 5,867,316 (Carlson et al.). Other suitable types of DRPF are described in U.S. Pat. No. 5,751,388 (Larson).

Some examples of wire grid polarizers useful in connection with the present disclosure include those described, e.g., in U.S. Pat. No. 6,122,103 (Perkins et al.). Wire grid polarizers are commercially available from, inter alia, Moxtek Inc., Orem, Utah.

Some examples of cholesteric polarizers useful in connection with the present disclosure include those described, e.g., in U.S. Pat. No. 5,793,456 (Broer et al.), and U.S. Patent Publication No. 2002/0159019 (Pokorny et al.). Cholesteric polarizers are often provided along with a quarter wave retarding layer on the output side so that the light transmitted through the cholesteric polarizer is converted to linearly polarized light.

In some embodiments, a polarization control layer 844 may be provided between the diffuser plate 848 and the reflective polarizer 842. Examples of polarization control layers 844 include a quarter wave retarding layer and a polarization rotating layer such as a liquid crystal polarization rotating layer. The polarization control layer 844 may be used to change the polarization of light that is reflected from the reflective polarizer 842 so that an increased fraction of the recycled light is transmitted through the reflective polarizer 842.

The optional arrangement 840 of light management films may also include one or more brightness enhancing layers. A brightness enhancing layer is one that includes a surface structure that redirects off-axis light in a direction closer to the axis of the display. This increases the amount of light propagating on-axis through the LC layer 852, thus increasing the brightness of the image seen by the viewer. One example of a brightness enhancing layer is a prismatic brightness enhancing layer, which has a number of prismatic ridges that redirect the illumination light through refraction and reflection. Examples of prismatic brightness enhancing layers that may be used in the display system 800 include the Vikuiti™ BEF II and BEF III family of prismatic films available from 3M Company, including BEF II 90/24, BEF II 90/50, BEF HIM 90/50, and BEF IIIT. In some embodiments, a polarization preserving refractive structure or structures can be utilized. Many types of refractive brightness enhancement films are highly birefringent and can depolarize the light emitted from the reflective polarizer. Substrates such as polycarbonate can be made to be sufficiently isotropic so as not to depolarize.

Brightness enhancement may also be provided by some of the embodiments of front reflectors as is further described herein.

The exemplary embodiment illustrated in FIG. 8 shows a first brightness enhancing layer 846a disposed between the reflective polarizer 842 and the LC panel 850. A prismatic brightness enhancing layer typically provides optical gain in one dimension. An optional second brightness enhancing layer 846b may also be included in the arrangement 840 of light management layers, having its prismatic structure oriented orthogonally to the prismatic structure of the first brightness enhancing layer 846a. Such a configuration provides an increase in the optical gain of the display system 800 in two dimensions. In other exemplary embodiments, the brightness enhancing layers 846a, 846b may be positioned between the backlight 810 and the reflective polarizer 842.

The different layers in the optional light management unit 840 may be free standing. In other embodiments, two or more of the layers in the light management unit 840 may be laminated together, for example as discussed in co-owned U.S. patent application Ser. No. 10/966,610 (Ko et al.). In other exemplary embodiments, the optional light management unit 840 may include two subassemblies separated by a gap, for example, as described in co-owned U.S. patent application Ser. No. 10/965,937 (Gehlsen et al.).

In general, one or both of the front and back reflectors of the backlights of the present disclosure can be positioned or shaped to provide a desired output light flux distribution. Any suitable technique can be used to determine what shape or position the reflectors should take to provide the desired distribution. For example, a hollow light recycling cavity having an output surface can be formed. The cavity can include a partially transmissive front reflector and a planar back reflector. One or more light sources can be positioned to emit light into the light recycling cavity over a limited angular range. A desired output light flux distribution can be selected. A first output light flux distribution can be measured and compared to the desired output light flux distribution. One or both of the front and back reflectors can then be shaped or positioned to provide the desired output light flux distribution. For example, portions of the back reflector can be shaped such that they slope away from the front reflector (e.g., portions 632, 636 of back reflector 630 of FIG. 6). Such a configuration can provide less light to transmit through the front reflector in regions corresponding to these sloped portions as is further described herein. Alternatively, one or more structures can be provided on one or both of the front and back reflectors to provide the desired output light flux distribution. A second output light flux distribution can be measured and compared to the desired output light flux distribution. Further shaping, forming, or positioning of one or both of the front and back reflectors can then be performed to provide the desired output light flux distribution. Any or all of the above-mentioned techniques can also be performed using any suitable computer modeling technique known in the art.

Unless otherwise indicated, references to "backlights" are also intended to apply to other extended area lighting devices that provide nominally uniform illumination in their intended application. Such other devices may provide either polarized or unpolarized outputs. Examples include light boxes, signs, channel letters, and general illumination devices designed for indoor (e.g. home or office) or outdoor use, sometimes referred to as "luminaires." Note also that edge-lit devices can be configured to emit light out of both opposed major surfaces—i.e., both out of the "front reflector" and "back reflector" referred to above—in which case both the front and back reflectors are partially transmissive. Such a device can illuminate two independent LCD panels or other graphic members placed on opposite sides of the backlight. In that case the front and back reflectors may be of the same or similar construction. Such two-sided backlights can be used, e.g., for double-sided signs, cell phones, etc. In some embodiments, a two-sided backlight can include a reflective member positioned within the cavity to direct light out of one or both major surfaces of the backlight. This reflective member can be fully reflective, partially transmissive, or can have a combination of reflective and transmissive properties. Further, one or both major surfaces of the reflective member can be shaped as is described herein. Any suitable reflector can be used for the reflective member.

The term "LED" refers to a diode that emits light, whether visible, ultraviolet, or infrared. It includes incoherent encased or encapsulated semiconductor devices marketed as "LEDs," whether of the conventional or super radiant variety. If the LED emits non-visible light such as ultraviolet light, and in some cases where it emits visible light, it is packaged to include a phosphor (or it may illuminate a remotely disposed phosphor) to convert short wavelength light to longer wavelength visible light, in some cases yielding a device that emits white light.

Phosphors can be mixtures of fluorescent material in a binder. The fluorescent material could be inorganic particles, organic particles, or organic molecules or a combination thereof. Suitable inorganic particles include doped garnets (such as YAG:Ce and (Y,Gd)AG:Ce), aluminates (such as $Sr_2Al_{14}O_{25}$:Eu, and BAM:Eu), silicates (such as SrBaSiO:Eu), sulfides (such as ZnS:Ag, CaS:Eu, and $SrGa_2S_4$:Eu), oxy-sulfides, oxy-nitrides, phosphates, borates, and tungstates (such as $CaWO_4$). These materials may be in the form of conventional phosphor powders or nanoparticle phosphor powders. Another class of suitable inorganic particles is the so-called quantum dot phosphors made of semiconductor nanoparticles including Si, Ge, CdS, CdSe, CdTe, ZnS, ZnSe, ZnTe, PbS, PbSe, PbTe, InN, InP, InAs, AlN, AlP, AlAs, GaN, GaP, GaAs and combinations thereof. Generally, the surface of quantum dot will be at least partially coated with an organic molecule to prevent agglomeration and increase compatibility with the binder. In some cases the semiconductor quantum dot may be made up of several layers of different materials in a core-shell construction. Suitable organic molecules include fluorescent dyes such as those listed in U.S. Pat. No. 6,600,175. Preferred fluorescent materials are those that exhibit good durability and stable optical properties. The phosphor layer may consist of a blend of different types of phosphors in a single layer or a series of layers, each containing one or more types of phosphors. The inorganic phosphor particles in the phosphor layer may vary in size (diameter) and they may be segregated such that the average particle size is not uniform across the cross-section of the layer. For example, the larger particles may tend to be on one side of the film while the smaller particles may tend to be located on the other side. This segregation could be accomplished by allowing the particles to settle before the binder is cured. Other suitable phosphors include thin film phosphors, e.g., Lumiramic™ phosphor technology, available from Lumileds, San Jose, Calif.

An "LED die" is an LED in its most basic form, i.e., in the form of an individual component or chip made by semiconductor processing procedures. The component or chip can include electrical contacts suitable for application of power to energize the device. The individual layers and other functional elements of the component or chip are typically formed on the wafer scale, and the finished wafer can then be diced into individual piece parts to yield a multiplicity of LED dies. An LED may also include a cup-shaped reflector or other reflective substrate, encapsulating material formed into a simple dome-shaped lens or any other known shape or structure, extractor(s), and other packaging elements, which elements may be used to produce a forward-emitting, side-emitting, or other desired light output distribution.

Unless otherwise indicated, references to LEDs are also intended to apply to other sources capable of emitting bright light, whether colored or white, and whether polarized or unpolarized, in a small emitting area. Examples include semiconductor laser devices, and sources that utilize solid state laser pumping, solid state light sources that incorporate photonic crystals, e.g., Phlatlight™ light sources, available from Luminus Devices, Inc. Billerica, Mass., and sources that incorporate quantum well down-converting elements such as quantum dots or quantum wells (see, e.g., U.S. Patent Application No. 60/978,304; and U.S. Patent Publication No. 2006/0124918).

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

EXAMPLES

The following examples were tested in a custom LED backlight test bed. The test bed was designed to simulate an LED-based area backlight for a 30" diagonal LCD panel. The hollow test bed backlight cavity was fabricated using stereolithography (SLA) rapid prototyping, with the long axis of the frame being placed horizontally. The bottom of the cavity was open to allow for insertion of LED light engines. The internal cavity depth was 16 mm. The back reflector was 404 mm in length and 107 mm in width.

The cavity and side walls were lined with Vikuiti™ Enhanced Specular Reflector polymeric multilayer film (ESR), available from 3M Company. The ESR had a hemispherical reflectivity of 99.4%.

As is further described below, various front reflector films were each attached to 1.5 mm thick clear PMMA plates (Cyro Acrylite FF, available from Cyro Corp., Rockaway, N.J.) by lamination with 3M OPT1™ optical transfer adhesive (available from 3M Company). The plates were attached to the hollow backlight cavity such that the front reflector faced into the cavity and the PMMA plate formed the outermost emissive surface of the test bed. The outer surface of the plate serves as the output surface for the test bed (i.e., the output surface of the backlight).

One LED light engine was affixed to the bottom edge of the backlight frame. The engine included 21 white-light emitting Luxeon™ LEDs (Luxeon Rebel LXHL-PWC1P-0080, available from Lumileds, San Jose, Calif.). The LEDs were arranged in a line on a circuit board with a 5 mm center-to-center spacing between each LED. The LEDs were powered by a constant-current drive circuit at 70 mA. The flux deviation angle from the light engine was ±22° relative to a transverse plane.

A parabolic reflector was fabricated using SLA and used to direct the light from the LED light engine into the hollow recycling cavity. ESR was laminated to the inside of the reflector. The length of the parabolic reflector was 21 mm and the opening adjacent the cavity was 13 mm in height.

The performance of the test bed was measured using a colorimetric camera (model PM 9913E-1, available from Radiant Imaging, Inc., Duvall, Wash.). The camera was fitted with a 105 mm lens (Sigma EX 105 mm 1:2.8D DG Macro) and an ND1 neutral density filter. The software supplied by Radiant Imaging was used to calibrate the camera and take measurements. Color and luminance calibration was done with the aid of a spot spectroradiometer (model PR650 available from Photo Research, Inc., Chatsworth, Calif. or a Minolta CS-100 from Konica Minolta Sensing Americas, Inc., Ramsey, N.J.). The test bed was placed in the horizontal orientation, 0.5 meters from the camera. The test bed was aligned to the camera such that the axis of the camera lens was normal to the front plate and aimed approximately at the center of the test bed.

The LEDs were turned on and warmed up for at least 30 minutes prior to recording any measurements. Measurements were carried out by configuring the test bed with the films to be tested, and then using the colorimetric camera to take pictures of the test bed.

Comparative Example

APF with Planar Front and Back Reflectors

The 30" backlight was configured having APF (a multilayer reflective polarizing film available from 3M Company. APF has a hemispheric reflectivity of 51.0%) as the front reflector and ESR as the back reflector. Beads were coated onto a major surface of the APF that faced the back reflector.

Figure 9:
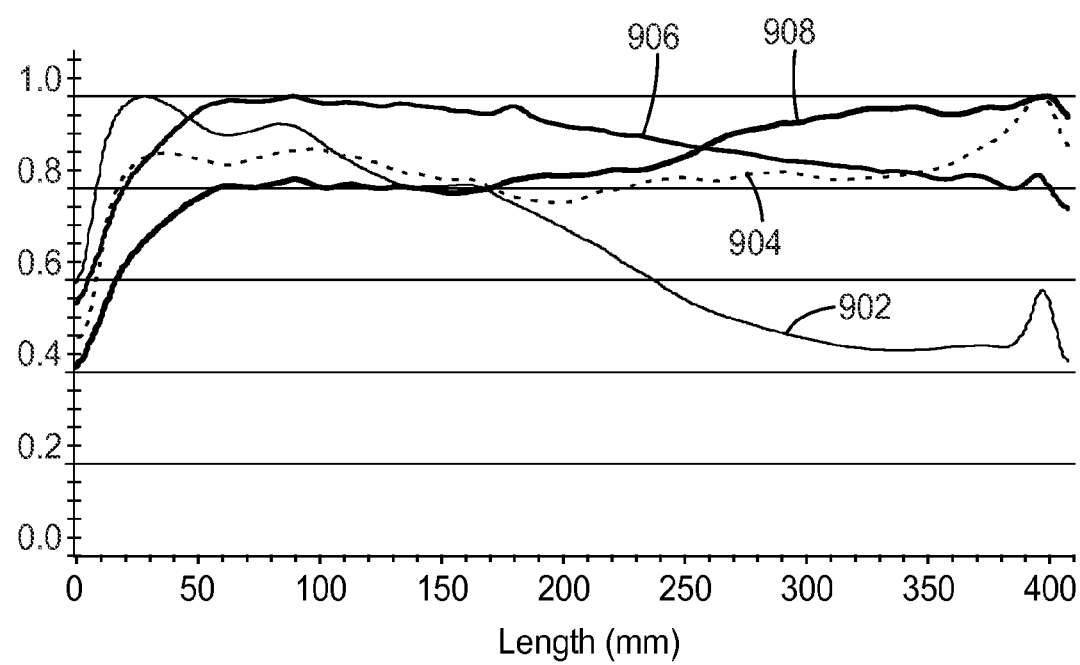
FIG. 9 is a graph of a cross-section of the output light flux distribution versus location for several embodiments of edge-lit backlights.

FIG. 9 shows a cross-section of the normalized output light flux distribution versus position in a plane taken orthogonal to the back reflector and the light engine. Curve 902 shows the results for this comparative example. As can be seen in FIG. 9, the output light flux drops quickly in a direction away from the light engine.

Example 1

APF Front Reflector with Non-Planar Back Reflector

For this example, a non-planar back reflector similar to the back reflector of the embodiment illustrated in FIG. 1 was formed in the 30" backlight by placing a ramp structure inside the cavity against the frame. The ramp had a first portion that was 179 mm in length that was parallel to the front reflector, a 182 mm sloping portion that was non-parallel to the front reflector, and a second parallel portion that was 43 mm in length. The sloping portion formed a 3° angle with the non-sloping portions of the back reflector. The ramp was lined with ESR. The same front reflector described in the comparative example was used for this example.

Curve 904 of FIG. 9 shows the cross-section output light flux distribution for this example. A more uniform cross-section was provided by the non-planar back reflector as compared to the comparative example.

Example 2

ARF-68 with Planar Back Reflector

The same backlight configuration used in the comparative example was used for this example. The ramp was taken out of the cavity. The front reflector was an asymmetric reflective film that included 274 alternating layers of birefringent 90/10 coPEN material and non-birefringent PMMA material. The 274 alternating microlayers were arranged in a sequence of ¼ wave layer pairs, where the thickness gradient of the layers was designed to provide a strong reflection resonance broadly and uniformly across a bandwidth from approximately 400 nm to 970 nm for one polarization axis, and a weaker reflection resonance for the orthogonal axis. Five micron thick skin layers of a blend of 75% SA115 and 25% DP2554 were disposed on the outside surfaces of the coherent altering microlayer stack. The overall thickness of the asymmetric reflective film, including the alternating microlayers, the PBLs and the skin layers, was approximately 50 µm. This film was manufactured using the techniques described, e.g., in U.S. Patent Application No. 60/939,079.

The birefringent refractive index values for the alternating microlayers of 90/10 coPEN and of PMMA material were measured at 633 nm. The indices for the coPEN microlayers were $nx1=1.820$, $ny1=1.615$, and $nz1=1.505$. The index of refraction for the PMMA microlayers were $nx2=ny2=nz2=1.494$.

ARF-68 had an average on-axis reflectivity of 68.4% in the pass axis, an average on-axis reflectivity of 99.5% in the block axis, and a hemispherical reflectivity of 83.2%.

Beads were coated onto a major surface of the ARF-68 that faced the back reflector.

Curve 906 of FIG. 9 represents a cross-section of the output light flux distribution for this example.

Example 3

ARF-68 with Non-Planar Back Reflector

For this example, the ramp of Example 1 was placed in the backlight cavity. The front reflector was the same as Example 2 and included the bead coating. Curve 908 of FIG. 9 represents a cross-section of the output light flux distribution for this example.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A backlight, comprising:
   a partially transmissive front reflector and a back reflector that form a hollow light recycling cavity comprising an output surface, wherein at least a first portion of the back reflector is non-parallel to the front reflector;
   at least one semi-specular element disposed within the hollow light recycling cavity; and
   one or more light sources disposed to emit light into the hollow light recycling cavity, wherein the one or more light sources are configured to emit light into the hollow light recycling cavity over a limited angular range.

2. The backlight of claim 1, wherein at least one of the front reflector and back reflector is non-planar.

3. The backlight of claim 1, wherein the first portion of the back reflector comprises at least 10% of a total surface area of the reflecting surface of the back reflector.

4. The backlight of claim 1, wherein a second portion of the back reflector is non-parallel to the front reflector.

5. The backlight of claim 1, wherein the back reflector is shaped to provide a desired output light flux distribution.

6. The backlight of claim 1, wherein the front reflector comprises a hemispherical reflectivity for unpolarized visible light of $R^f_{hemi}$, and the back reflector comprises a hemispherical reflectivity of unpolarized visible light of $R^b_{hemi}$, and wherein $R^f_{hemi} * R^b_{hemi}$ is at least 0.55.

7. The backlight of claim 1, wherein a distance H measured between the front and back reflectors taken normal to the output surface varies along at least one of a length L and a width W of the hollow light recycling cavity.

8. The backlight of claim 7, wherein H is at a minimum proximate a center region of the light recycling cavity.

9. The backlight of claim 7, wherein H is at a maximum proximate an edge region of the light recycling cavity.

10. The backlight of claim 7, wherein the one or more light sources are disposed proximate an edge of the backlight, and further wherein H decreases in a direction away from the edge of the backlight.

11. The backlight of claim 1, wherein the output surface defines a transverse plane, and the one or more light sources emit light into the light recycling cavity with an average flux deviation angle relative to the transverse plane in a range from 0 to 40 degrees.

12. The backlight of claim 1, wherein the back reflector comprises a concave shape facing away from the front reflector.

13. The backlight of claim 1, wherein at least a first portion of the back reflector comprises a non-specularly reflective region.

14. The backlight of claim 1, wherein the at least one semi-specular element comprises a transport ratio greater than 15% at a 15 degree incidence angle and less than 95% at a 45 degree incidence angle.

15. The backlight of claim 1, wherein the at least one semi-specular element is disposed on a major surface of the front reflector that faces the back reflector.

16. The backlight of claim 1, wherein the at least one semi-specular element is disposed on a major surface of the back reflector that faces the front reflector.

17. The backlight of claim 1, wherein the transport ratio for the at least one semi-specular element, for light of a given incidence angle, equals (F−B)/(F+B), where F is the amount of light scattered into forward directions upon interaction of the incident light with the element, and B is the amount of light scattered into backwards directions upon interaction of the incident light with the element.

18. The backlight of claim 1, wherein the front reflector comprises a reflectivity that generally increases with angle of incidence and a transmission that generally decreases with angle of incidence.

19. The backlight of claim 1, wherein a ratio of the luminance proximate the center region of the output surface to the luminance proximate the edge region of the output surface is at least about 1.10.

20. The backlight of claim 1, wherein the front reflector comprises a polymeric multilayer reflective polarizing film.

21. The backlight of claim 20, wherein the at least one semi-specular element comprises a layer disposed on a major surface of the polymeric multilayer reflective polarizing film facing the back reflector.

22. The backlight of claim 1, wherein the one or more light sources are disposed proximate at least one edge of the backlight.

23. The backlight of claim 22, wherein the backlight further comprises a non-planar back reflector.

24. The backlight of claim 1, wherein the backlight is a direct-lit backlight.

25. A sign comprising the backlight of claim 1.

26. A luminaire comprising the backlight of claim 1.

27. A method of forming a backlight that is operable to provide a desired output light flux distribution, comprising:
forming a hollow light recycling cavity comprising an output surface, wherein the hollow light recycling cavity further comprises a partially transmissive front reflector, a planar back reflector, and a semi-specular element disposed within the hollow light recycling cavity;
positioning one or more light sources to emit light into the light recycling cavity over a limited angular range;
selecting the desired output light flux distribution;
measuring a first output light flux distribution;
comparing the first output light flux distribution to the desired light flux distribution;
shaping the back reflector or altering the reflective properties of the semi-specular element;
measuring a second output light flux distribution; and
comparing the second output light flux distribution to the desired output light flux distribution.

28. The method of claim 27, wherein shaping the back reflector comprises thermoforming the back reflector.

29. The method of claim 27, wherein shaping the back reflector comprises bending the back reflector.

30. The method of claim 27, wherein shaping the back reflector comprises stamping the back reflector.

31. A display system, comprising:
a display panel; and
a backlight disposed to provide light to the display panel, the backlight comprising:
a partially transmissive front reflector and a back reflector that form a hollow light recycling cavity comprising an output surface, wherein at least a first portion of the back reflector is non-parallel to the front reflector;
at least one semi-specular element disposed within the hollow light recycling cavity; and
one or more light sources disposed to emit light into the hollow light recycling cavity, wherein the one or more light sources are configured to emit light into the hollow light recycling cavity over a limited angular range.

* * * * *

UNITED STATES PATENT AND TRADEMARK OFFICE
CERTIFICATE OF CORRECTION

PATENT NO. : 9,541,698 B2
APPLICATION NO. : 12/918549
DATED : January 10, 2017
INVENTOR(S) : Wheatley et al.

It is certified that error appears in the above-identified patent and that said Letters Patent is hereby corrected as shown below:

Page 3, Column 2 (Other Publications)
Line 11, delete "Intergrated" and insert -- Integrated --

Column 1
Line 7, after "U.S.C." insert -- § --

Column 11
Line 8, delete "HIGHT" and insert -- HIGH --

Column 15
Line 67, delete "Veredlung" and insert -- Veredelung --

Column 27
Line 53, delete "HIM" and insert -- IIIM --

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*